US012713035B2

(12) United States Patent
Le Leannec et al.

(10) Patent No.: US 12,713,035 B2
(45) Date of Patent: Aug. 18, 2026

(54) TRANSFORM UNIT PARTITIONING FOR CLOUD GAMING VIDEO

(71) Applicant: InterDigital CE Patent Holdings, SAS, Paris (FR)

(72) Inventors: Fabrice Le Leannec, Betton (FR); Franck Galpin, Thorigne-Fouillard (FR); Tangi Poirier, Thorigné-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 47 days.

(21) Appl. No.: 18/698,862

(22) PCT Filed: Oct. 5, 2022

(86) PCT No.: PCT/EP2022/077644

§ 371 (c)(1),
(2) Date: Apr. 5, 2024

(87) PCT Pub. No.: WO2023/057487

PCT Pub. Date: Apr. 13, 2023

(65) Prior Publication Data

US 2024/0422329 A1 Dec. 19, 2024

(30) Foreign Application Priority Data

Oct. 5, 2021 (EP) .................................... 21306392

(51) Int. Cl.
*H04N 19/176* (2014.01)
*H04N 19/119* (2014.01)
(Continued)

(52) U.S. Cl.
CPC ......... *H04N 19/176* (2014.11); *H04N 19/119* (2014.11); *H04N 19/159* (2014.11); *H04N 19/18* (2014.11)

(58) Field of Classification Search
CPC .. H04N 19/176; H04N 19/119; H04N 19/159; H04N 19/18; H04N 19/463; H04N 19/60; H04N 19/70; H04N 19/103
See application file for complete search history.

(56) References Cited

U.S. PATENT DOCUMENTS

2015/0249828 A1 9/2015 Rosewarne et al.
2020/0280742 A1* 9/2020 Ramasubramonian ...................... H04N 19/593

(Continued)

OTHER PUBLICATIONS

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.

(Continued)

*Primary Examiner* — Nam D Pham
(74) *Attorney, Agent, or Firm* — Condo Roccia Koptiw LLP

(57) ABSTRACT

A first device may be configured to perform actions. A coding block may be obtained. It may be determined whether an indication of transform unit (TU) transform information associated with the coding block is to be parsed based on a TU size of the transform tree node. Inverse transformation associated with the coding block may be performed based on the determination. A second device may be configured to determine a TU split for a coding unit based on depth information and perform transformation on the coding unit based on the determination. A third device may determine whether to include an indication of TU transform information in video data based on a TU size of coding block and may perform transformation associated with the coding block based on the determination.

20 Claims, 24 Drawing Sheets

(51) Int. Cl.
*H04N 19/159* (2014.01)
*H04N 19/18* (2014.01)

(56) References Cited

U.S. PATENT DOCUMENTS

2021/0006836 A1* 1/2021 Kondo .................. H04N 19/17
2021/0321111 A1* 10/2021 Tamse ................. H04N 19/137

OTHER PUBLICATIONS

Bross et al., "Versatile Video Coding (Draft 10)", JVET-S2001-v1, Editors, Joint Video Experts Team (JVET) of ITU-T SG 16 WP 3 and ISO/IEC JTC 1/SC 29/WG 11, 19th Meeting: by teleconference, Jun. 22-Jul. 1, 2020, 526 pages.
Bross et al., "Versatile Video Coding Editorial Refinements on Draft 10", JVET-T2001-v2, Editors, Joint Video Experts Team (JVET) of ITU-T SG 16 WP 3 and ISO/IEC JTC 1/SC 29, 20th Meeting, by Teleconference, Oct. 7-16, 2020, pp. 1-511.
Browne et al., "Algorithm Description for Versatile Video Coding and Test Model 14 (VTM 14)", JVET-W2002-v1, Editors, JVET of ITU-T SG 16 WP 3 and ISO/IEC JTC 1/SC 29, 23rd Meeting, by teleconference, Jul. 7-16, 2021, pp. 1-105.
Egilmez et al., "CE6: RQT-Like Transform Partitioning for Inter Blocks (Test 6.4.2)", JVET-M0523-v1, Qualcomm Incorporated, Joint Video Experts Team (JVET) of ITU-T SG 16 WP 3 and ISO/IEC JTC 1/SC 29/WG 11, 13th Meeting: Marrakesh, MA, Jan. 9-18, 2019, pp. 1-4.
Zhao et al., "CE6: RQT-Like Sub-Block Transform for Inter Blocks (Test 6.4.4)", JVET-M0141-v1, Huawei Technologies Co., Ltd., Joint Video Experts Team (JVET) of ITU-T SG 16 WP 3 and ISO/IEC JTC 1/SC 29/WG 11, 13th Meeting: Marrakech, MA, Jan. 9-18, 2019, 5 pages.
Zhao et al., "CE6: RQT-Like Transform Sub-Block Splitting (Test 6.4.3)", JVET-M0499, Tencent, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-3.

* cited by examiner

TRANSFORM UNIT PARTITIONING FOR CLOUD GAMING VIDEO

CROSS REFERENCE TO RELATED APPLICATIONS

This application is the National Stage Entry under 35 U.S.C. § 371 of Patent Cooperation Treaty Application No. PCT/EP2022/077644, filed Oct. 5, 2022, which claims priority to EP Provisional Patent Application No. EP21306392.8, filed on Oct. 5, 2021, and entitled "TRANSFORM UNIT PATITIONING FOR CLOUD GAMING VIDEO CODING," the entirety of which is incorporated by reference as if fully set forth herein.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed for performing transform unit partitioning (e.g., for cloud gaming video coding). A device may include a processor configured to obtain a coding block. Whether an indication of transform unit (TU) transform information associated with the coding block is to be parsed may be determined based on a TU size of the coding block. Inverse transformation associated with the coding block may be performed based on the determination.

In an example, the indication of TU transform information associated with the coding block may indicate whether the coding block is to be partitioned into a plurality of TUs. Based on a condition that the TU size of the coding block corresponds to a supported TU size, the device may determine to parse the indication of TU transform information associated with the coding block and determine whether the coding block is to be partitioned based on the indication. Based on a condition that the TU size of the coding block corresponds to an unsupported TU size, the device may determine that the indication of TU transform information associated with the coding block is not to be parsed and infer that the coding block is to be partitioned into multiple TUs.

In an example, the indication of TU transform information may indicate whether at least a value of a residual block of the coding block is non-zero. Based on a condition that the TU size of the coding block corresponds to a supported TU size, the device may determine to parse the indication of TU transform information associated with the coding block and determine the value of the residual block of the coding block based on the indication. Based on a condition that the TU size of the coding block corresponds to an unsupported TU size, the device may determine that the indication of TU transform information associated with the coding block is not to be parsed and infer that a residual block of the coding block is zero.

In an example, the indication of TU transform information associated with the coding block is configured to indicate a residual coding mode for the coding block. Based on a condition that the TU size of the coding block corresponds to a supported TU size, the device may determine to parse the indication of TU transform information associated with the coding block that is configured to indicate residual coding mode for the coding block and determine the residual coding mode for the coding block based on the indication. Based on a condition that the TU size of the coding block corresponds to an unsupported TU size, the device may determine that the indication of TU transform information associated with the coding block is not to be parsed and infer the residual coding mode for the coding block is transform skip mode.

A device may determine a TU split for a coding unit at least in part on depth information and perform transformation on the coding unit based on the determination. In an example, the device may obtain edge information in a coding block associated with the coding unit based on the depth information associated with the coding block. The TU split may be determined based on the edge information.

For a coding block, a device, such as a video encoding device may determine whether to include an indication of TU transform information in video data based on a TU size of the coding block. The device may perform transformation associated with the coding block based on the determination. Video data may include a video bitstream.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

DETAILED DESCRIPTION

A more detailed understanding may be had from the following description, given by way of example in conjunction with the accompanying drawings.

Figure 1A:
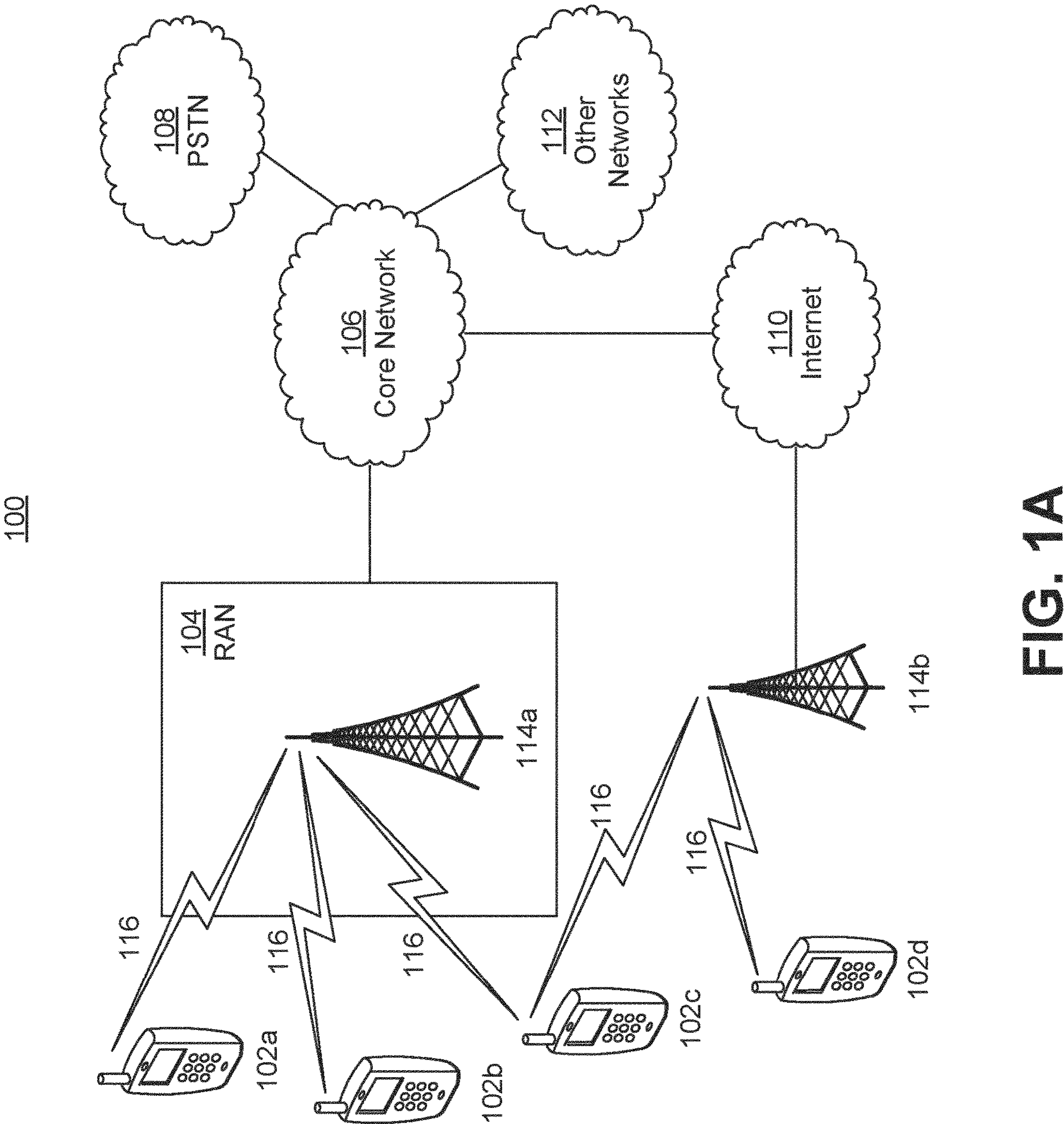
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and/or the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and/or the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
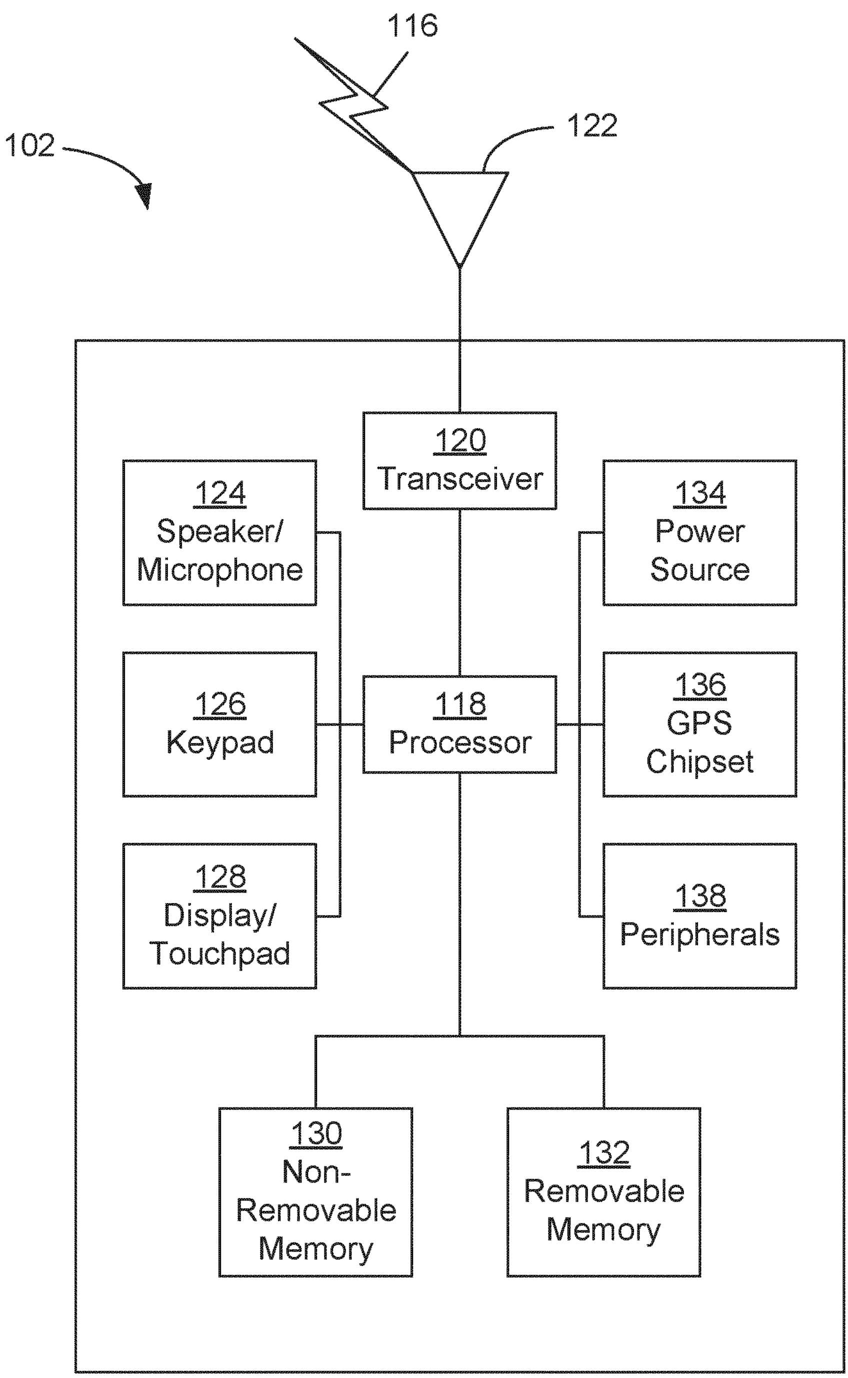
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and/or the like. The peripherals 138 may include one or more sensors. The sensors may be one or more of a gyroscope, an accelerometer, a hall effect sensor, a magnetometer, an orientation sensor, a proximity sensor, a temperature sensor, a time sensor, a geolocation sensor, an altimeter, a light sensor, a touch sensor, a magnetometer, a barometer, a gesture sensor, a biometric sensor, and/or a humidity sensor, for example.

The WTRU 102 may include a full duplex radio for which transmission and/or reception of some or all of the signals (e.g., associated with particular subframes for both the UL (e.g., for transmission) and/or DL (e.g., for reception)) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and/or reception of some or all of the signals (e.g., associated with particular subframes for either the UL (e.g., for transmission) or the DL (e.g., for reception)) may not be concurrent and/or simultaneous.

Figure 1C:
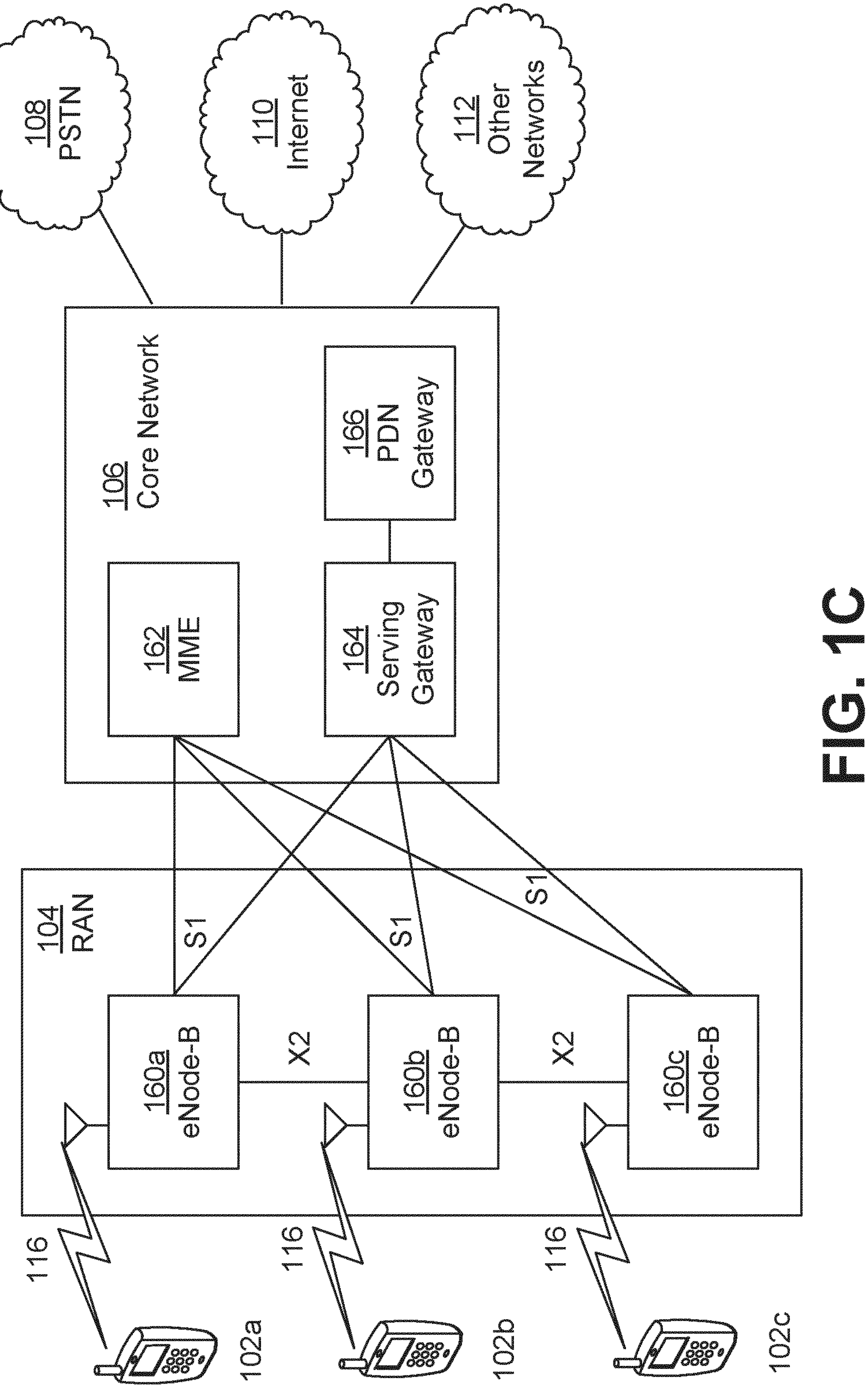
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and/or storing contexts of the WTRUs 102*a*, 102*b*, 102*c*, and/or the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHZ. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
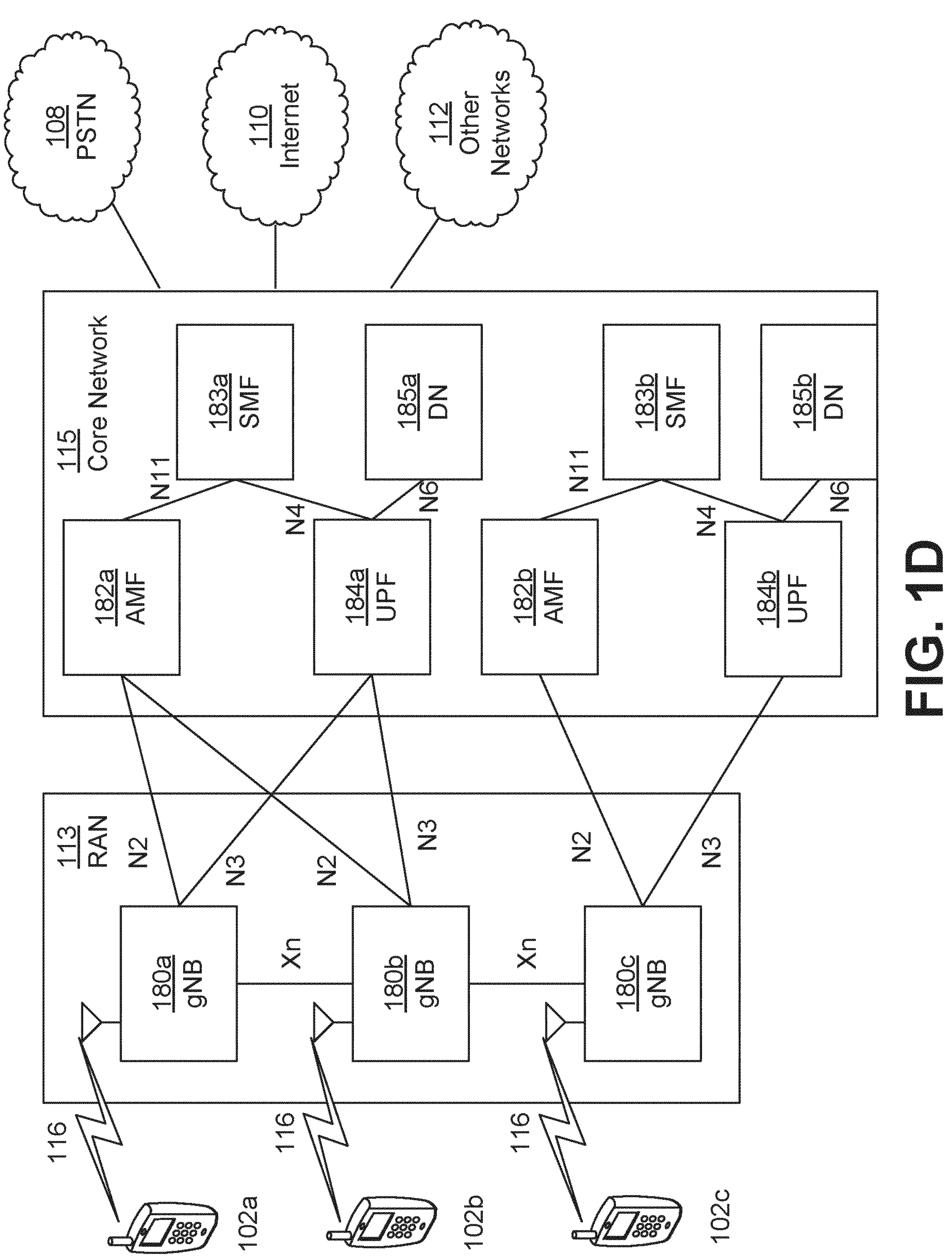
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with and/or connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and/or the like. Network slicing may be used by the AMF 182*a*, 182*b* to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and/or the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*,

102*b*, 102*c* may be connected to a local Data Network (DN) 185*a*, 185*b* through the UPF 184*a*, 184*b* via the N3 interface to the UPF 184*a*, 184*b* and/or an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and/or interchanged with aspects described in earlier filings as well.

The aspects described and contemplated in this application may be implemented in many different forms. FIGS. 5-18 described herein may provide some examples, but other examples are contemplated. The discussion of FIGS. 5-18 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
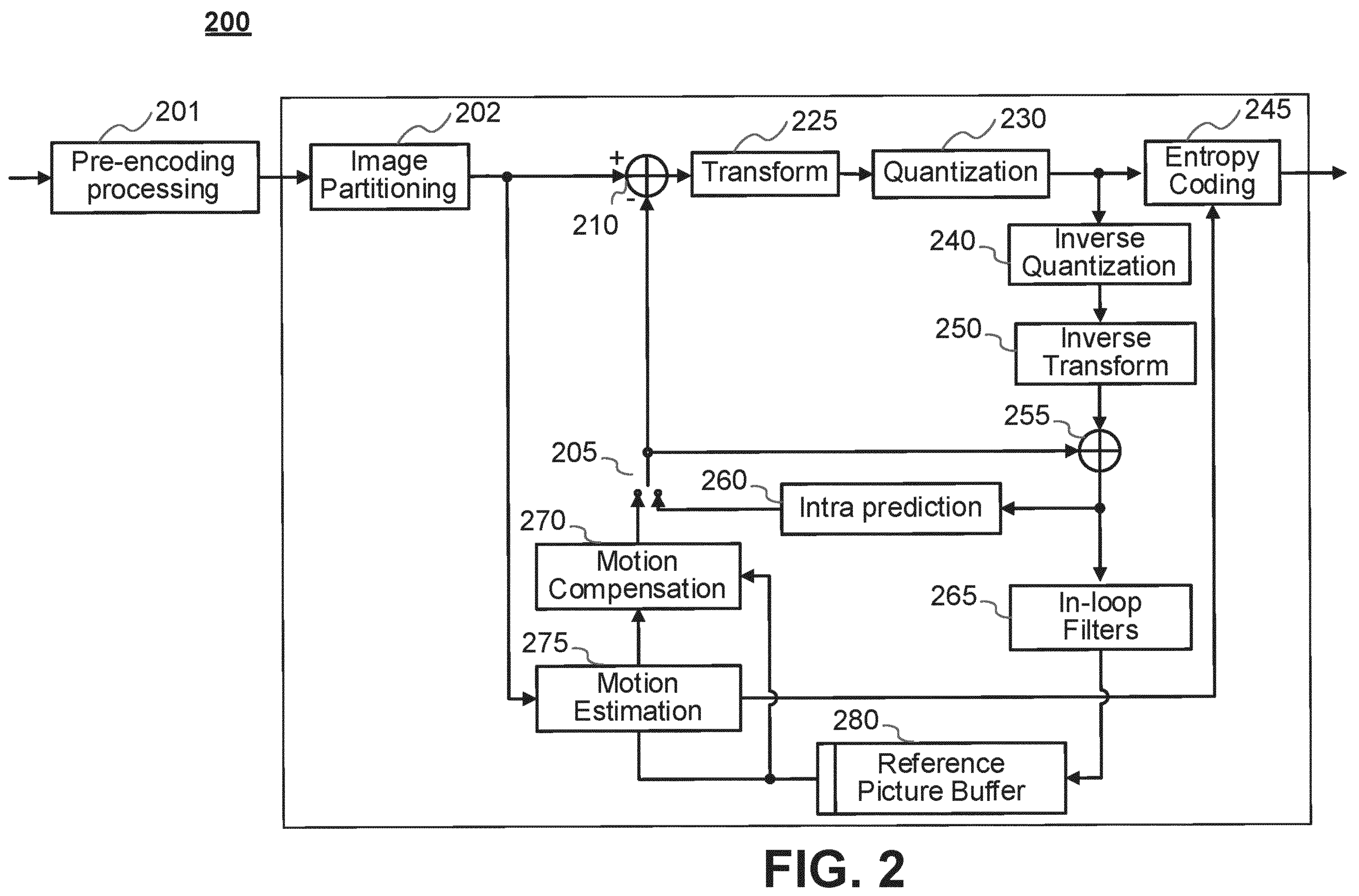
FIG. 2 illustrates an example video encoder.
Figure 3:
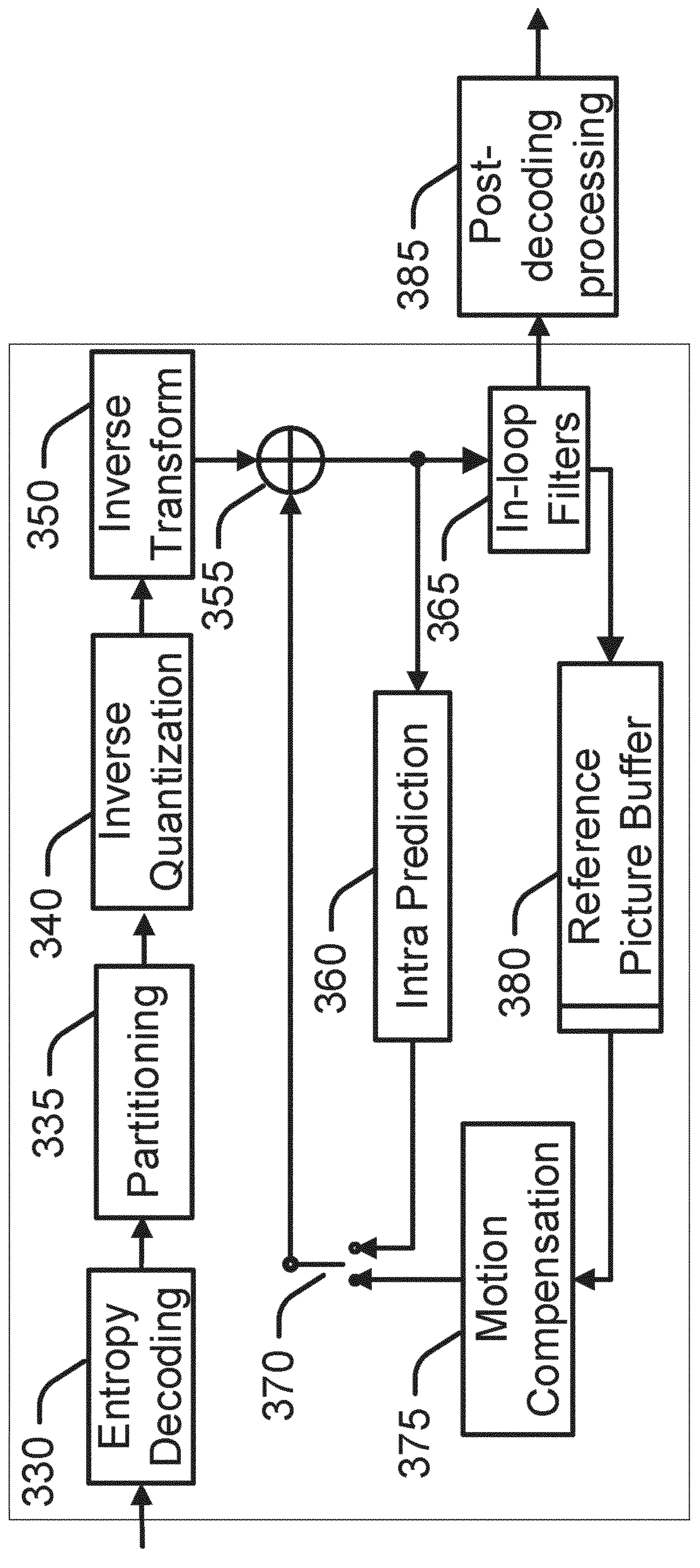
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format, or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing and attached to the bitstream.

In the encoder 200, a picture is encoded by the encoder elements as described below. The picture to be encoded is partitioned (202) and processed in units of, for example, coding units (CUs). Each unit is encoded using, for example, either an intra- or inter-prediction mode. When a unit is encoded in an intra-prediction mode, it performs intra prediction (260). In an inter-prediction mode, motion estimation (275) and compensation (270) are performed. The encoder decides (205) which one of the intra-prediction mode or inter-prediction mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

References to a flag herein may refer to an indication, an indication of information, etc.

Figure 4:
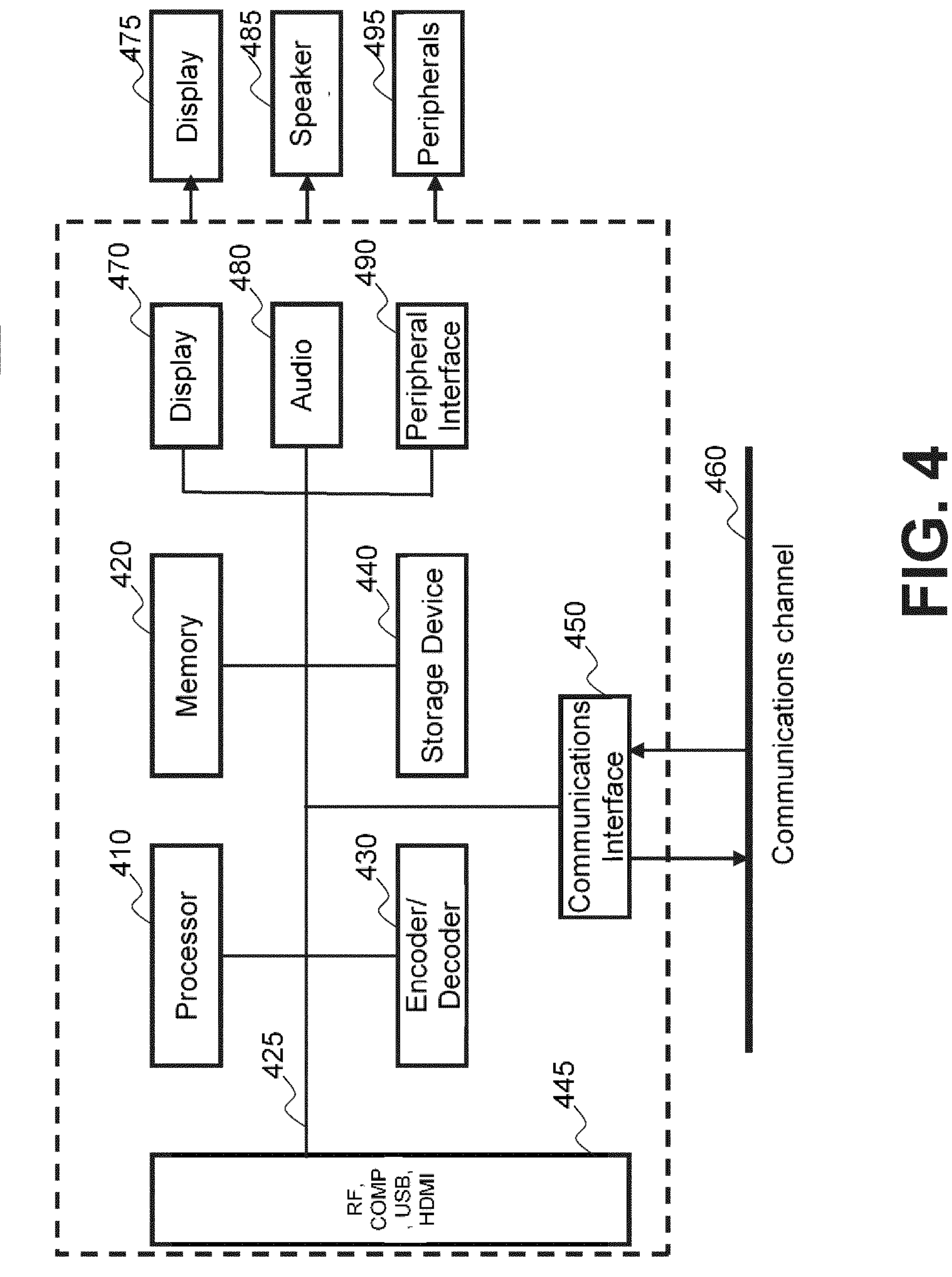
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video, portions of the decoded video, the bitstream, matrices, variables, and/or intermediate or final results from the processing of equations, formulas, operations, and/or operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High-Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing. Within the integrated housing, the various elements may be interconnected and transmit data therebetween using suitable connection arrangement 425, for example, an internal bus as known in the art, including the Inter-IC (12C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touchscreen display, an organic light-emitting diode (OLED) display, a curved display, and/or a foldable display. The display 475 may be for a television, a tablet, a laptop, a cell phone (mobile phone), or another device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and/or removable memory, as non-limiting examples. The processor 410 may be of any type appropriate to the technical environment, and can encompass one or more of microprocessors, general purpose computers, special purpose computers, and/or processors based on a multi-core architecture, as non-limiting examples.

Various implementations involve decoding. "Decoding," as used in this application, can encompass all or part of the processes performed, for example, on a received encoded sequence to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining whether a TU split indication associated with a transform tree node is to be parsed based on a TU size of the transform tree node, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining a TU split for a coding unit based on depth information and performing coding unit transformation based on the determination, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on TU split context based on intra-prediction mode of the enclosing CU, direction of generalized binary split applied to the current TU, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, split_tu_flag, split_tu_horizontal_flag, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, and/or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

Figure 5:
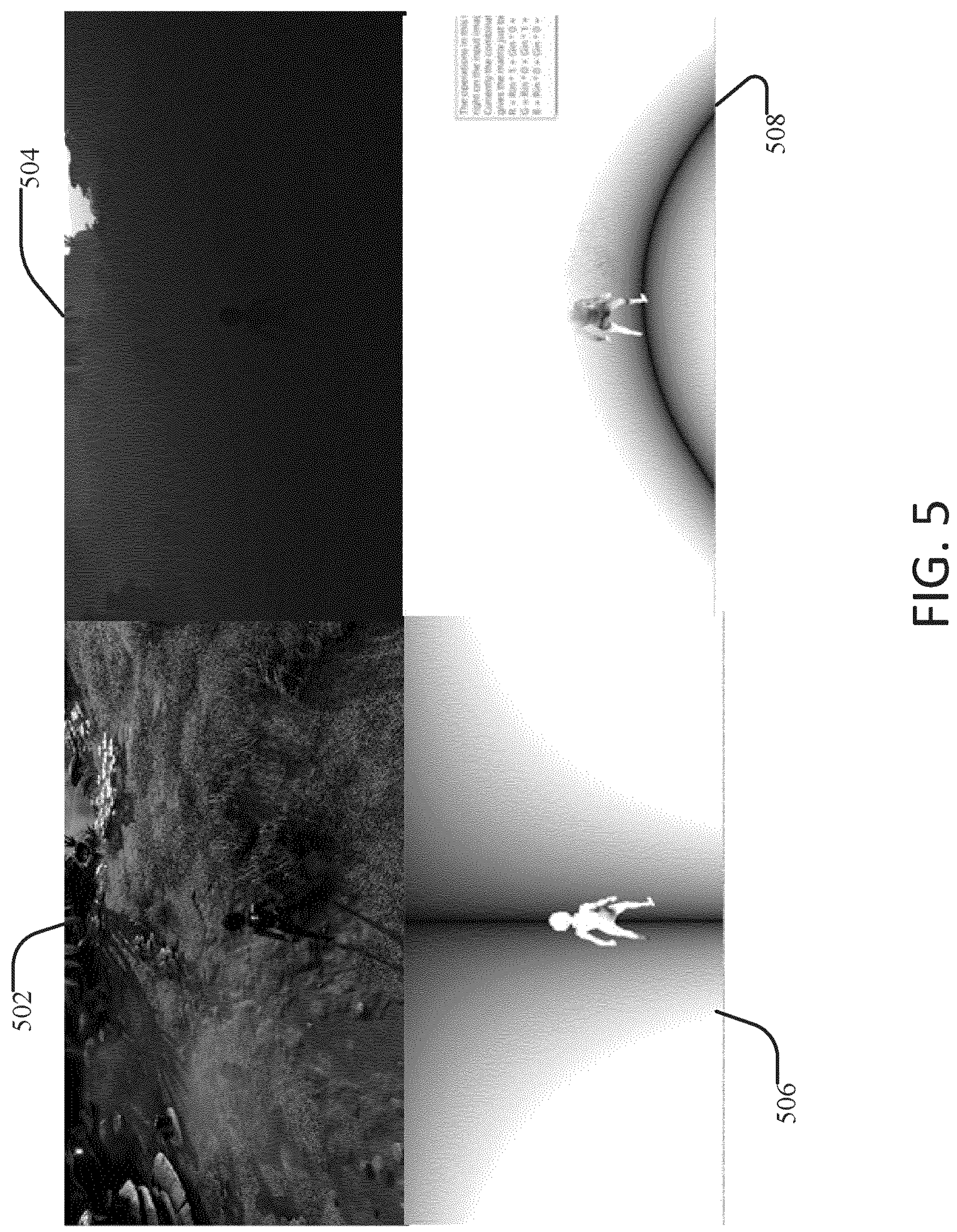
FIG. 5 illustrates an example texture frame of a video game with a corresponding depth map, horizontal motion data, and vertical motion data.

A video coding system such as a cloud gaming server or a device with light detection and ranging (LiDAR) capabilities may receive input video frames (e.g., texture frames) together with depth information (e.g., a depth map) and/or motion information, which may be correlated. FIG. 5 illustrates an example texture frame 502 of a video game with a corresponding depth map 504, horizontal motion data 506, and vertical motion data 508 that may be extracted (e.g., directly) from a game engine that is rendering the game scene.

A depth map may be represented by a grey-level image, which may indicate the distance between a camera and an actual object. A depth map may represent the basic geometry of the captured video scene. A depth map may correspond to a texture picture of a video content and may include a dense monochrome picture of the same resolution as the luma picture. In examples, the depth map and the luma picture may be of different resolutions.

Figure 6:
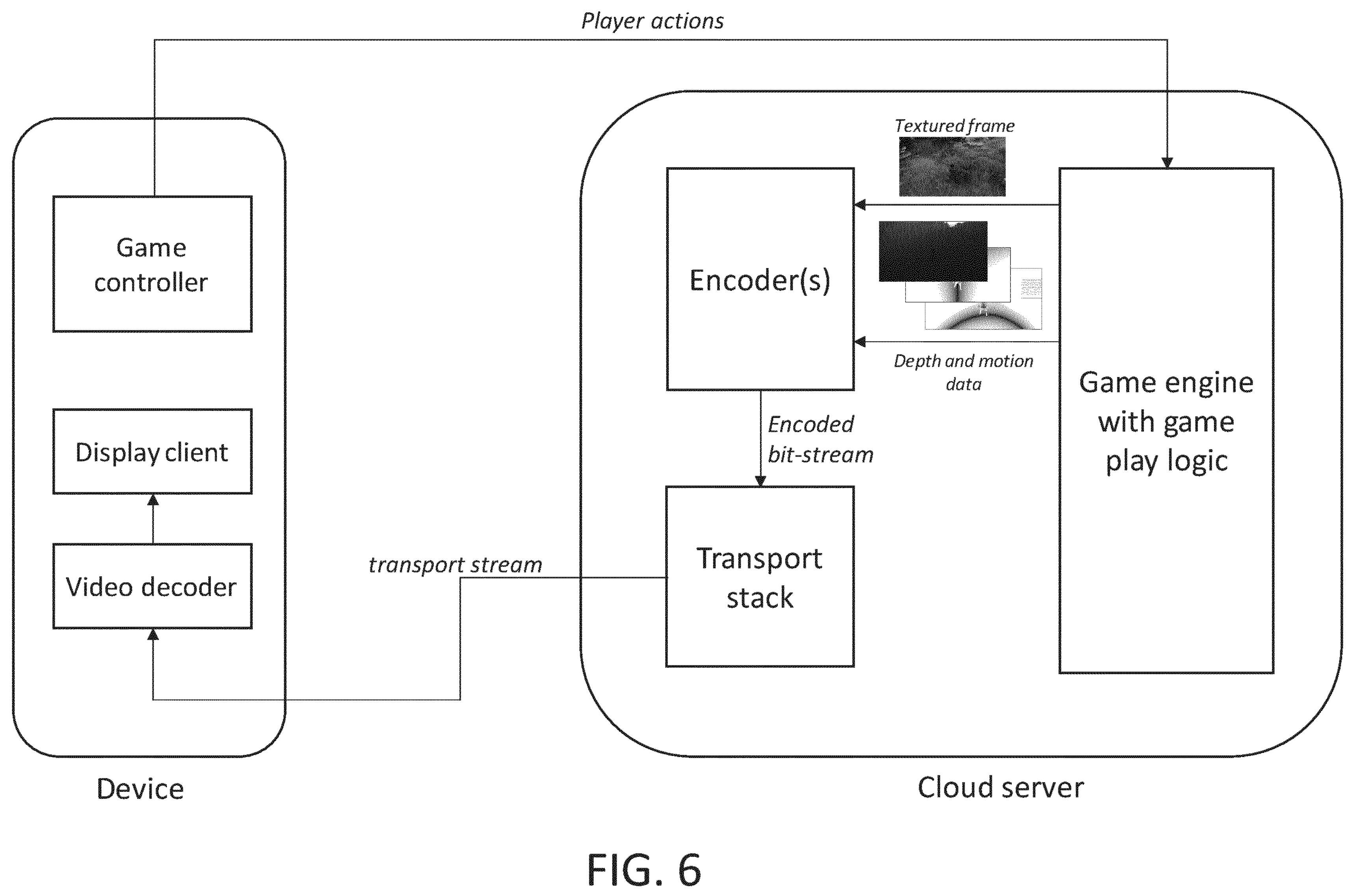
FIG. 6 illustrates an example architecture of a cloud gaming system

FIG. 6 shows an example architecture of a cloud gaming system, where a game engine may be running on a cloud server. The gaming system may render a game scene based on the player actions. The rendered game scene may be encoded into a bitstream, for example, using a video encoder. The bitstream may be encapsulated by a transport protocol and may be sent as a transport stream to the player's device. The player's device may de-encapsulate and decode the transport stream and present the decoded game scene to the player.

As illustrated in FIG. 6, additional information such as a depth map, motion information, an object ID, an occlusion mask, camera parameters, etc. may be obtained from a game engine (e.g., as outputs of the game engine) and made available to the cloud server (e.g., an encoder of the cloud) as prior information.

The information described herein such as the depth or motion information or a combination of both may be utilized to help speed up the block partitioning operations on a video processing device (e.g., the encoder side of a video codec). The block partitioning operations may be simplified utilizing such information while still preserving coding gains (e.g., compression gains).

A high degree of flexibility in the block representation of a video in a compressed domain may be implemented, e.g., in a way that there may be a limited increase in a rate distortion optimization search space (e.g., on an encoder side).

For example, a set of modes may be used to partition a given rectangular coding unit (CU) into at least 2 transform units (TUs). A generalized binary splitting of the CU into 2 TUs may be used. The generalized TU binary split may be applied in a recursive way. For example, a given TU resulting from the CU splitting may be split (e.g., further split) into smaller TUs. In examples, TU splitting mode(s) (e.g., the extended TU splitting mode(s) described herein) may be signaled (e.g., explicitly) in a bitstream. Binary TU split mode(s) (e.g., the extended binary TU split mode(s) described herein) may be derived/inferred, e.g., according to transmitted side information.

For example, the side information may correspond to depth information (e.g., some depth information related to the picture block being encoded/decoded). For example, the side information may result from a representation of depth information (e.g., some depth information related to the picture block being encoded/decoded). For example, the side information may correspond to motion information (e.g., some motion information related to the picture block being coded/decoded). For example, the side information may result from a representation of motion information (e.g., some motion information related to the picture block being coded/decoded). For example, transform tree depth level(s) may be derived from the side information (e.g., the side information that is transmitted to the decoder). For example, usage of the TU splitting derivation mode (e.g., where TU splitting may be derived from transmitted side information) may be signaled via syntax element(s) (e.g., dedicated syntax element(s)).

Figure 7:
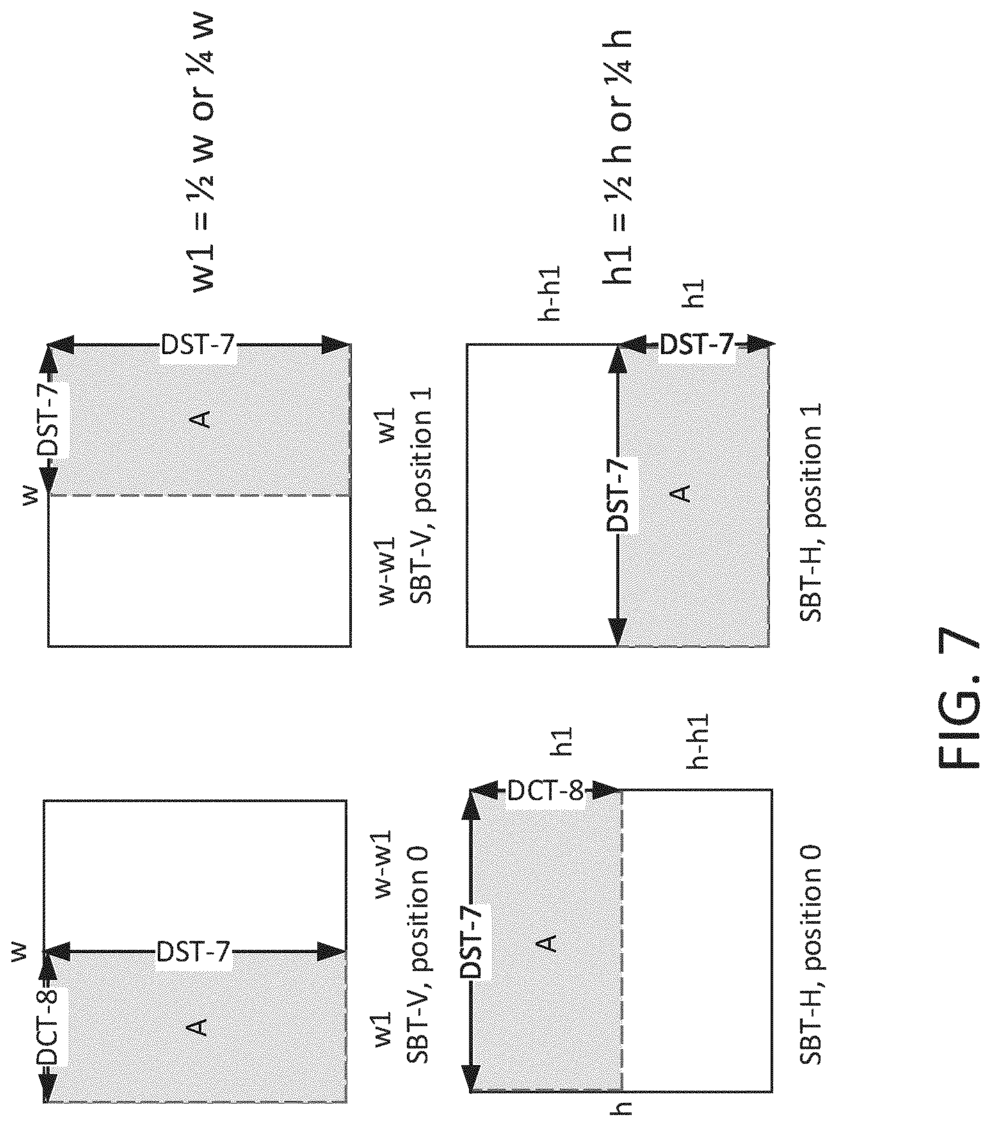
FIG. 7 illustrates an example sub-block transform (SBT) tool of an example compression system.

In some examples of an inter-predicted CU (e.g., an inter-predicted CU that is signaled with non-zero residual block), a sub-block transform (SBT) tool may split the CU into multiple TUs (e.g., 2 TUs in a binary fashion). One of the two resulting TUs may have a non-zero residual block, and the other one may have zero residual data. The binary split applied may be symmetric or asymmetric. In a symmetric binary split, the two resulting TU may have equal sizes, which may be half the size of the CU (e.g., in the orientation of the split). In an asymmetric binary split, one TU may have a size equal to ¼ of a parent CU (e.g., along the splitting orientation), and the other TU size may be ¾ the size of the CU (e.g., along the split orientation). FIG. 7 illustrates an example SBT tool of an example compression system described herein.

A TU with non-zero residual may be coded with inferred adaptive transform(s). 1D transforms used may depend on a position of the non-zero residual TU, e.g., as illustrated in FIG. 7.

The TU splitting of the inter-predicted CU may be signaled through indications (e.g., flags, such as 3 flags). An indication, such as a cu_sbt_flag may indicate the use of SBT for the CU. In the case that SBT is used, a SBT type and/or a SBT position may be signaled, e.g., using coded flag(s). An indication, such as a cu_sbt_quad_flag may indicate the use of asymmetric binary split. The flag may be coded, e.g., if both symmetric and asymmetric splits are allowed for the current CU. A flag (e.g., a cu_sbt_horizontal_flag) may indicate the orientation of the binary split. The flag may be coded, e.g., if both horizontal and vertical splits are allowed for the current CU, and/or for the previously signaled SBT split type (e.g., asymmetric or symmetric). A flag (e.g., a cu_sbt_pos_flag) may indicate a position of the non-zero residual TU. The flags described herein may be context-based coded.

In some examples, the splitting of a CU (e.g., into TUs) may be in quad-tree fashion, may be in a symmetrical binary tree fashion, may be in a ternary tree fashion, and/or may be in asymmetric fashion with split ratio (1/4,3/4) or (3/4,1/4) in the horizontal and/or vertical orientation.

Generalized binary splitting of a CU into TUs may be enabled. A binary split of a CU into TUs (e.g., with the split ratios that may be supported with the transform sizes present) may be enabled. In some examples, transform sizes of the form 2^n with n being a number between 1 and 8 (e.g., including 1 and 8) may be supported.

A CU of size 2^N may be split into 2 TUs (e.g., the TUs with respective sizes 2^n and (2^N−2^n), with N>n). When the TU size (e.g., 2^N−2^n) corresponds to a supported transform size (which may happen in the case of a symmetric binary tree), the two TUs may be coded or may be further split. If the TU size (e.g., 2^N−2^n) does not correspond to a supported transform size, the TU may be coded with zero residual, or may be split into smaller TUs.

Figure 8:
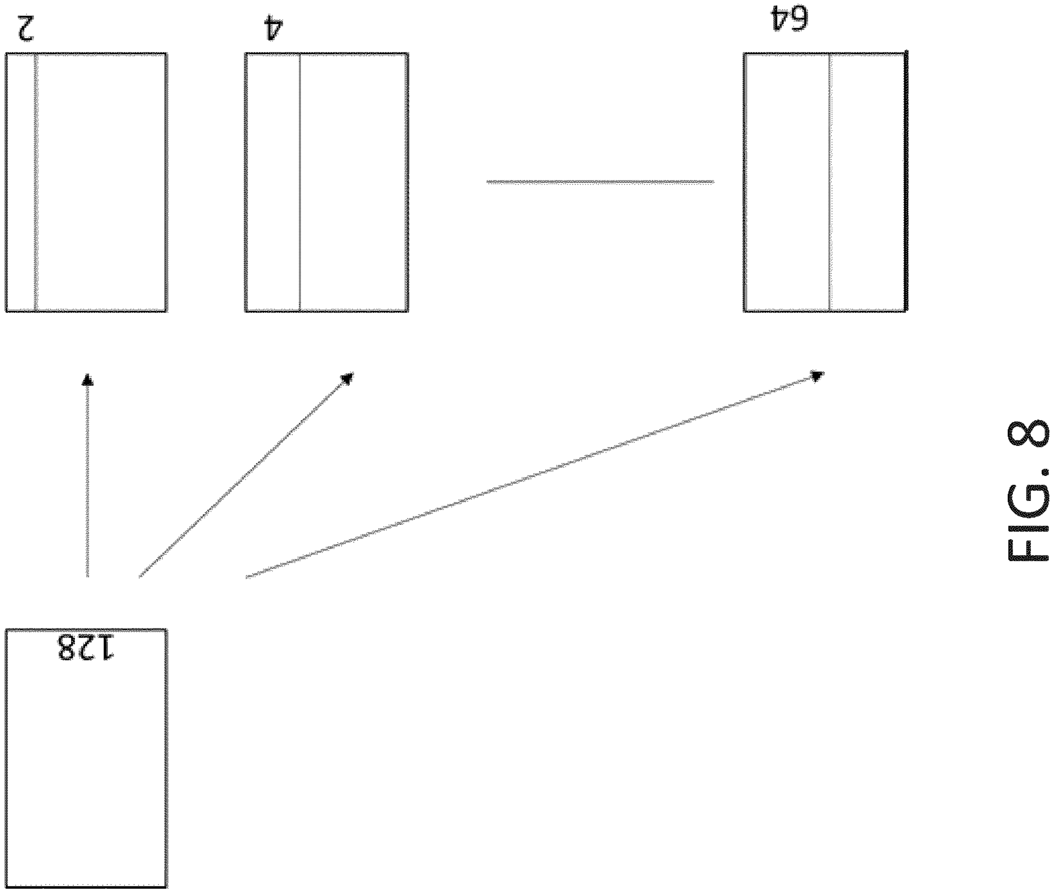
FIG. 8 illustrates an example of extended transform unit (TU) split modes.

Transform sizes may be added to the set of supported transform sizes. For example, the added transforms sizes may include transform sizes 12, 24 and/or 48. FIG. 8 illustrates an example of extended TU split modes.

Transform sizes described herein may bring flexibility to block representation. The flexibility may affect the transform and/or quantization entropy coding part(s) of a coding/decoding process. Additional search for prediction mode(s) (e.g., best prediction mode(s) and/or CU partitioning (e.g., best CU partitioning) may be skipped. An increase of complexity (e.g., at an encoder side) may be limited. A low latency requirement (e.g., a low latency requirement of a cloud gaming application scenario) may be complied with.

Figure 9:
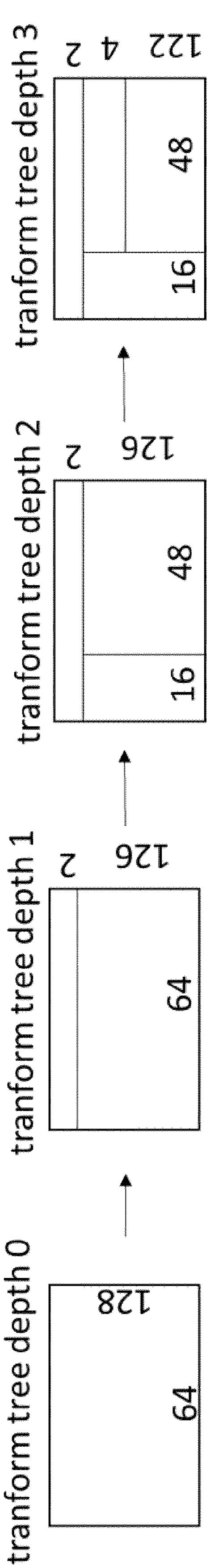
FIG. 9 illustrates an example of generalized binary TU split.

Split(s) into TUs (e.g., rectangular TUs) may be recursive and a transform tree may be employed. The split(s) in the transform tree may be binary and may be generalized (e.g., to any split ratio). FIG. 9 illustrates an example of generalized binary TU split.

For example, an indication of a transform tree may be explicitly signaled, e.g., in a bitstream. The indication may include a flag. The indication may indicate TU transform information. For example, the indication (e.g., a split_tu_flag) may indicate a TU split (e.g., a further TU split) of a current coding block. For example, the indication (e.g., a split_tu_horizontal_flag) may indicate a direction of the TU split and/or a position of the split line (e.g., the binary split line).

For example, the indication (e.g., a tu_cb_coded_flag, a tu_cr_coded_flag, and/or a tu_y_coded_flag) may indicate whether a value of a residual block is zero. When the tu_cb_coded_flag is set to 1, the Cb transform block may contain one or more transform coefficient levels not equal to zero (e.g., a value of the residual block is not zero). When the tu_cb_coded_flag is not present, its value may be inferred to be equal to zero (e.g., a value of the residual block is zero). When the tu_cr_coded_flag is set to 1, the Cr transform block may contain one or more transform coefficient levels not equal to zero. When tu_cr_coded_flag is not present, its value may be inferred to be equal to zero. When the tu_y_coded_flag is set to 1, the luma transform block may contain one or more transform coefficient levels not equal to zero.

For example, the indication may indicate a residual coding mode for the coding block. For example, a transform_skip_flag may specify whether a transform is applied to the associated transform block or not (e.g., whether a transform skip mode is enabled). The transform skip mode may have a dedicated residual coding mode.

An encoder may search for a TU split (e.g., a best TU split) in a CU (e.g., a considered CU). The encoder search may use side information (e.g., auxiliary information, supplementary information, information aside from a video). Side information may be or may include depth information of the frames in the video (e.g., as shown in FIG. 5).

The encoder search for the split lines (e.g., the best split lines) may lead to a high combinatory (e.g., a large search space size for choosing a best TU partitioning for the current CU), e.g., in terms of recursive transform tree rate distribution (RD) optimization. This encoder complexity may be limited, e.g., by deciding the transform tree based on some edge information, which may be detected in a depth map. A limited number of TU split configuration(s) may be preselected and may undergo a rate distortion competition (e.g., a full rate distortion competition).

Whether an indication of transform unit (TU) transform information associated with a coding block is to be parsed may be determined based on a TU size of the coding block (e.g., transform tree node). In an example, the indication of TU transform information may indicate whether the coding block is to be partitioned into multiple TUs. In an example, the indication of TU transform information may indicate whether at least a value of a residual block of the coding block is non-zero. In an example, the indication of TU transform information associated with the coding block is configured to indicate a residual coding mode for the coding block.

The coding block may be a transform tree node or a transform tree leaf. In an example, the indication of TU transform information associated with the coding block may indicate whether the transform tree node is to be further partitioned into multiple TUs. For example, the indication of TU transform tree information may be or may include a split_tu_flag, which may indicate a TU split (e.g., a further TU split) of a current coding block.

In an example, the signaling of the indication may be conditioned on whether a transform size is supported in the codec. A given node of the transform tree may have a corresponding TU size (e.g., transform tree node size). If the corresponding TU size does not correspond to a supported transform size, the TU may be inferred to be further split into smaller TUs. Based on a condition that the TU size of the coding block corresponds to an unsupported TU size, the video encoding device may determine to skip signaling of the split_tu_flag indication. The video decoding device may determine that the indication of TU transform information associated with the coding block is not to be parsed from the video data and infer that the coding block is to be partitioned into multiple TUs. Based on a condition that the TU size of the coding block corresponds to a supported TU size, the decoding device may determine to parse the indication of TU transform information associated with the coding block and determine whether the coding block is to be partitioned based on the indication.

In an example, based on a TU size not being supported, whether the TU tree node is to be further split may be determined based on indication(s) in video data. The TU transform information (e.g., whether the TU is further split) may be explicitly signaled (e.g., via a flag). If a transform tree leaf has no corresponding transform size supported in the codec, the residual block of the considered TU may be inferred to be zero.

In an example, the indication of whether at least a value of a residual block of the coding block is non-zero may be conditionally signaled based on whether the TU size of the coding block corresponds to a supported TU size. The indication may be or may include one or more of a tu_cb_coded_flag, a tu_cr_coded_flag, and/or a tu_y_coded_flag, which may indicate whether a value of a residual block is zero. When the tu_cb_coded_flag is set to 1, the Cb transform block may contain one or more transform coefficient levels not equal to zero (e.g., a value of the residual block is not zero). When the tu_cb_coded_flag is not present, its value may be inferred to be equal to zero (e.g., a value of the residual block is zero). When the tu_cr_coded_flag is set to 1, the Cr transform block may contain one or more transform coefficient levels not equal to zero. When tu_cr_coded_flag is not present, its value may be inferred to be equal to zero. When the tu_y_coded_flag is set to 1, the luma transform block may contain one or more transform coefficient levels not equal to zero.

The video encoder may determine to skip signaling of the indication of whether at least a value of a residual block of the coding block is non-zero, based on the TU size of the coding block corresponding to an unsupported TU size. The video decoder may determine that the indication of TU transform information associated with the coding block is not to be parsed from video data and infer that a residual block of the coding block is zero. Based on a condition that the TU size of the coding block corresponds to a supported TU size, the decoder may determine to parse the indication of whether at least a value of a residual block of the coding block is non-zero and determine the value of the residual block of the coding block based on the indication.

In an example, the indication of a residual coding mode for the coding block may be conditionally signaled based on whether the TU size of the coding block corresponds to a supported TU size. For example, a transform_skip_flag may specify whether a transform is applied to the associated transform block or not (e.g., whether a transform skip mode is enabled). In an example, if no transform size is supported for a transform tree leaf size (e.g., a TU size), a residual coding mode for the TU may be inferred. For example, a texture coding process used for that TU may be inferred to be a transform-skip residual coding process.

Based on a condition that the TU size of the coding block corresponds to an unsupported TU size, the video encoder may determine to skip signaling of the indication of transform skip mode. The decoder may determine that the indication of whether transform skip mode is enabled for the coding block is not to be parsed from video data and infer that the residual coding mode for the coding block is transform skip mode. Based on a condition that the TU size of the coding block corresponds to a supported TU size, the decoder may determine to parse the indication of whether transform skip mode is enabled for the coding block and determine the residual coding mode for the coding block based on the indication.

Table 1 shows an example syntax extension that may be used to support a flexible TU splitting process. In the example syntax extension, a condition determining whether or not further TU split may be allowed (e.g., a "furtherTUSplitAllowed" condition) may be computed, e.g., based on a size of a current transform tree node (e.g., (tbWidth, tbHeight) and/or allowed TU split modes for the current transform tree node size/current TU size.

A condition, such as the inferredFurtherTUSplit condition, may indicate whether or not the current transform tree node is inferred to be split. For example, the inferredFurtherTUSplit condition being true may indicate that the current transform tree node is inferred to be split. The condition may be evaluated to be true (e.g., generally), e.g., if the current transform tree node is not allowed for transforming, quantizing, or entropy coding the texture residual data contained in the current transform unit (TU).

In an example, the inferredFurtherTUSplit condition may be evaluated based on a set of allowed transform sizes. If the current TU size does not correspond to a supported transform size, the TU split may be inferred.

In an example, the inferredFurtherTUSplit condition may be evaluated based on a set of disallowed TU sizes (e.g., a pre-stored set of TU sizes). The set of disallowed TU sizes may include TU sizes that may not be allowed as a transform tree leaf size. If the current TU size belongs to the set of disallowed sizes, the current TU may be inferred to be further partitioned into smaller TUs.

If the current TU size is allowed, whether the current TU is further split may be explicitly signaled, e.g., via the split_tu_flag.

If the current TU is not further split and no supported transform size corresponds to the current TU size, a considered residual block (e.g., a residual block associated with the current TU) may be coded with a transform skip residual coding mode. If the current TU is not further split and no supported transform size corresponds to the current TU size, a considered residual block (e.g., a residual block associated with the current TU) may be inferred to have a value of zero.

A discrete cosine (DC) coefficient (e.g., a simple DC coefficient), which may correspond to an average sample value of the residual, may be coded. A choice between the ways of coding the residual block described herein may be driven, e.g., by pre-defined rule(s) in the considered codec. For example, in the case of TU sizes that are relatively small in width and/or height, a transform skip residual coding mode may be used. For example, in the case of TUs that are relatively large in width and/or height, a DC-only coefficient coding mode may be used.

TABLE 1

An example syntax extension that may be used to support a flexible TU splitting process

```
                                                                                              Descriptor
transform__tree( x0, y0, tbWidth, tbHeight, treeType, chType ) {
  if(furtherTUsplitAllowed) {
    If(!inferredFurtherTuSplit)
      split__tu__flag                                                                         ae(v)
    If(split__tu__flag || inferredFurtherTuSplit){
      split__tu__horizontal__flag                                                             ae(v)
      split__tu__ratio
      If(split__tu__horizontal__flag){
        transform__tree( x0, y0, tbWidth, subTu1Height, treeType, chType )
        transform__tree( x0, y0+subTu1Height, tbWidth, tbHeight− subTu1Height, treeType, chType )
      }
      else{
        transform__tree( x0, y0, subTu1Width, tbHeight, treeType, chType )
        transform tree( x0+subTu1Width, y0, tbWidth− subTu1Width, tbHeight, treeType, chType )
      }
    }
  }
  InferTuCbfLuma = 1
  if( IntraSubPartitionsSplitType = = ISP__NO__SPLIT && !cu__sbt__flag ) {
    if( tbWidth > MaxTbSizeY | | tbHeight > MaxTbSizeY ) {
        verSplitFirst = ( tbWidth > MaxTbSizeY && tbWidth > tbHeight ) ? 1 : 0
        trafoWidth = verSplitFirst ? ( tbWidth / 2 ) : tbWidth
        trafoHeight = !verSplitFirst ? ( tbHeight / 2) : tbHeight
        transform__tree( x0, y0, trafoWidth, trafoHeight, treeType, chType )
        if( verSplitFirst )
          transform__tree( x0 + trafoWidth, y0, trafoWidth, trafoHeight, treeType, chType )
        Else
          transform__tree( x0, y0 + trafoHeight, trafoWidth, trafoHeight, treeType, chType )
    } else {
        transform__unit( x0, y0, tbWidth, tbHeight, treeType, 0, chType )
    }
  } else if( cu__sbt__flag ) {
    if( !cu__sbt__horizontal__flag ) {
        trafoWidth = tbWidth * SbtNumFourthsTb0 / 4
        transform__unit( x0, y0, trafoWidth, tbHeight, treeType, 0, 0 )
        transform__unit( x0 + trafoWidth, y0, tbWidth − trafoWidth, tbHeight, treeType, 1, 0 )
    } else {
        trafoHeight = tbHeight * SbtNumFourthsTb0 / 4
        transform__unit( x0, y0, tbWidth, trafoHeight, treeType, 0, 0 )
        transform__unit( x0, y0 + trafoHeight, tbWidth, tbHeight − trafoHeight, treeType, 1, 0 )
    }
  } else if( IntraSubPartitionsSplitType = = ISP__HOR__SPLIT ) {
    trafoHeight = tbHeight / NumIntraSubPartitions
    for( partIdx = 0; partIdx < NumIntraSubPartitions; partIdx++ )
        transform__unit( x0, y0 + trafoHeight * partIdx, tbWidth, trafoHeight, treeType, partIdx, 0 )
  } else if( IntraSubPartitionsSplitType = = ISP__VER__SPLIT ) {
    trafoWidth = tbWidth / NumIntraSubPartitions
    for( partIdx = 0; partIdx < NumIntraSubPartitions; partIdx++ )
        transform__unit( x0 + trafoWidth * partIdx, y0, trafoWidth, tbHeight, treeType, partIdx, 0 )
  }
}
```

Syntax extension(s) may operate in conjunction with intra-prediction mode(s). The syntax extension (e.g., as shown in table 1) may include a flag (e.g., a split_tu_horizontal_flag) that indicates the direction (e.g., horizontal or vertical) of a TU split (e.g., a generalized binary split) being applied to the current TU.

In some examples, a TU split characteristic for a given coding block may be determined based on an intra-predication mode of the coding block. For example, the flag (e.g., indicating the TU transform information) may be inferred according to the intra-prediction direction, e.g., in the case that the current transform tree is enclosed within a coding unit coded in an intra-prediction mode.

In some examples, the TU split characteristic may include one of more of: a TU split direction or a TU split ratio. For example, the intra-prediction mode of the coding block may be used to determine a direction of the TU split. For example, a split direction and/or a split ratio of the coding block may be determined based on the intra-prediction mode. For example, in the case of thin TUs in the horizontal or vertical directions, some intra direction(s) may be much more likely than some others, e.g., if the TUs are in a directional intra-prediction mode. For example, the vertical and horizontal intra-prediction modes are much more likely to be used than other directions/angles.

An intra-prediction mode may be signaled, e.g., before the TU split information is signaled. In an example, it may be inferred that the TU is not divided into thin sub-TUs, e.g., if an intra-prediction mode associated with the enclosing coding unit (CU) is different from a horizontal intra-prediction mode, a vertical intra-prediction mode, a DC intra-prediction mode, a planar intra-prediction mode or a MIP (matrix-based intra-prediction) mode. An indication of whether the TU is split may be skipped in the bitstream.

In an example, a split_tu_flag may be content-based adaptive binary arithmetic coding (CABAC) coded, e.g., with a context that depends on an intra-prediction mode of the enclosing CU. Two contexts may be used. One context may be used in the case that the intra-prediction mode is vertical, horizontal, DC, planar, or MIP. Another context may be used in the case that the intra-prediction mode is none of vertical, horizontal, DC, planar, or MIP. An advantage may be lowered entropy of the split_tu_flag syntax element. An advantage may be that the encoder is not prevented (e.g., aggressively) from using some non-frequent combinations of TU sizes and/or intra-prediction modes.

A transform tree may be derived (e.g., normatively), e.g., from transmitted depth information. For example, coded depth information may be obtained, e.g., from a bitstream. Edge information of a coding block may be determined based on the coded depth information. A transform unit split for the coding block may be determined based on the edge information. In an example, the processor may be configured to perform inverse transform for the code block based on the transform unit split.

For example, depth information may be obtained. A video bitstream may be generated to include indication(s) of the depth information. In an example, the depth information may be obtained from a game engine.

For example, the generalized transform binary tree may not be explicitly signaled to the decoder. Some data (e.g., some compact data) representative of some depth information may be issued, e.g., from a server-side game engine. Such data may be transmitted to a video decoder, e.g., together with a compression video stream. A decoder may retrieve (or may be able to retrieve) some information aside from the compressed blocks. Such information may be used to derive the TU split of a coding unit.

Figure 10:
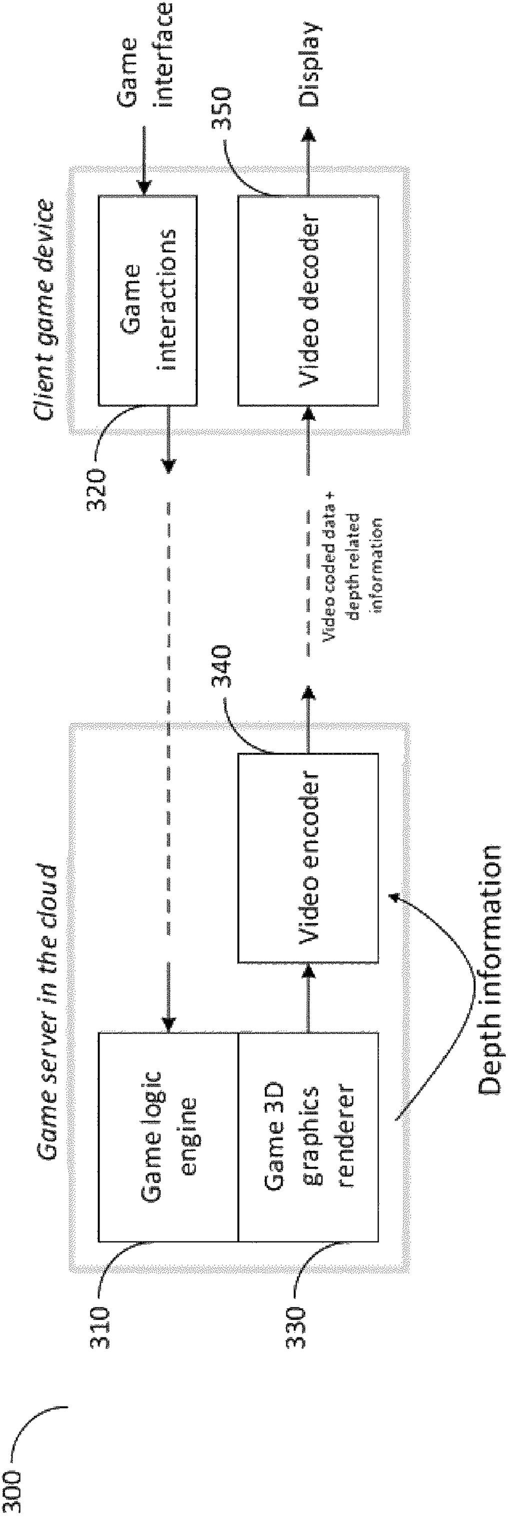
FIG. 10 illustrates an example video encoder/decoder system.

FIG. 10 illustrates an example video encoder/decoder system. The video encoder/decoding system may be part of a cloud gaming system. Some depth information may be given to the encoder by a game engine. The depth information may be transformed to a compact representation and may be transmitted in a coded video bitstream. On the decoder side, the auxiliary depth information may be obtained, decoded, and/or used to generate information, which may be used to derive some edge information in a picture or in a coded block.

The edge information may be used by the decoder, e.g., to derive the TU split in a given CU. In an example, the TU split may be derived/inferred. In an example, the TU split derivation may be partial, and may be combined with partial coding/decoding of the TU split information. For example, a flag signaling that a CU is split into at least 2 TUs may be inferred/derived by the decoder.

The orientation of a binary CU split into 2 TUs may be omitted from the bitstream and may be derived by the decoder.

An increased video compression efficiency in the context of the cloud gaming application described herein may be due to the game video data having access to depth information aside from the video itself.

For example, at CU level, the TU splitting of a CU (e.g., a considered CU) into at least 2 TUs (e.g., based on the aside edge related information) may be signaled, e.g., through a flag (e.g., a dedicated flag). If the flag equals true, all or a part of the transform tree associated to the considered CU may be derived, e.g., from the received side information. If the flag does not equal true, regular decoding of the CU may be performed/achieved.

For example, the TU split information derived/deduced from the side information may be used to drive a probability model of the entropy decoder, which may reduce the cost of the TU split flag coding, without removing the possibility of coding TU split information different from the TU split information that is derived/deduced the side information.

In some examples, TU characteristics for the coding block may be determined based on an inter prediction mode of the coding block. For example, a split direction and/or a split ratio of the coding block may be determined based on the inter-prediction mode.

For example, the inter-prediction mode for a coding block may be obtained based on the video bitstream. The motion information associated with reference samples of the coding block may be determined. A TU split for the coding block may be determined based on the motion information associated with reference samples. In an example, the inter-prediction mode may be a merge mode and the reference samples of the coding block may be associated with a neighboring coding block bordering a top border of the coding block. In an example, the inter-prediction mode may be a merge mode and the reference samples of the coding block may be associated with a neighboring coding block bordering a left border of the coding block.

In an example, the TU split tree may be inferred, e.g., from decoded syntax element(s) (e.g., already decoded syntax element value(s). The inference may be performed several ways. The inference may be a soft inference. Using a soft inference, a syntax element may be used to decide a CABAC probability model, e.g., by deriving a context as a function of the syntax element(s). Using a soft reference, a split syntax may be chosen and the coding cost (e.g., the coding cost associated with the most probable split derived from the syntax element) may be lower.

The inference may be a hard inference. Using a hard inference, the most probable split may be derived from the syntax element and may drive the split tree.

The most probable mode or probability context may be derived. For example, the TU split may be derived in an inter prediction block in a merge mode (e.g., a regular merge mode).

In the case of blocks using the inter prediction mode (e.g., where the prediction signal is computed from samples derived from a reference frame), the TU split may be derived from decoded syntax element(s).

In an example, if a block uses a merge mode (or a skip mode) (e.g., where the motion information is derived from a candidate in a list), the split of the TU tree may be derived as a binary split.

Figure 11:
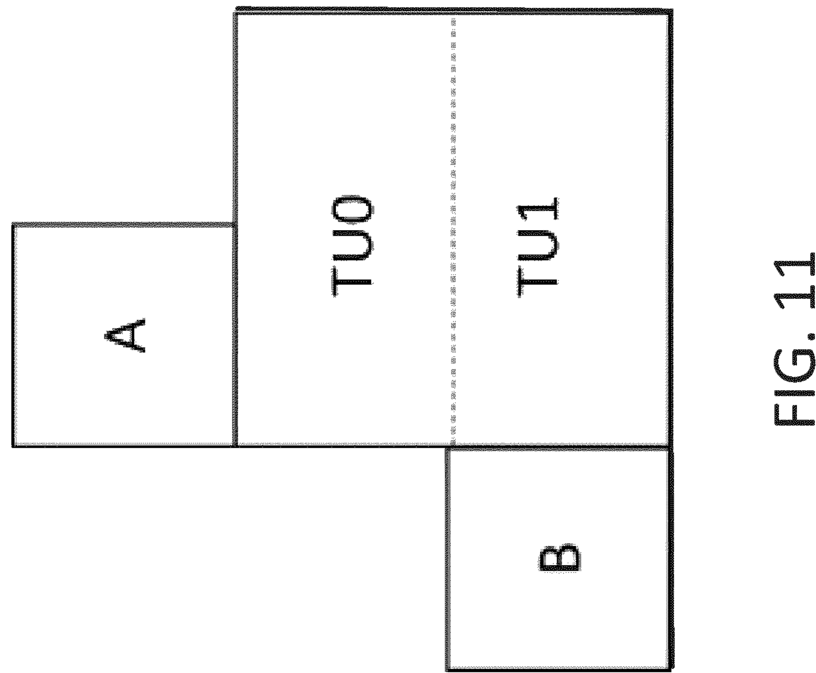
FIG. 11 illustrates an example of TU split.

TU split information (e.g., direction) may be inferred from previously decoded motion information based on reference samples of a neighboring block of the current CU. FIG. 11 illustrates an example of TU split. In FIG. 11, the current CU may derive its motion information from the top block. The TU split may be derived as horizontal. The TU0 may be inferred as non-coded (e.g., the residual is inferred to be null). The coefficients decoding may be started, e.g., after the decoding of the motion candidate used by the block (e.g., the candidate A here) (e.g., to solve potential parsing issue(s)). The coefficients may be assumed to be from a horizontal TU (or respectively a vertical TU) and may be rotated if the candidate is on the left (or respectively on the top) (e.g., to solve potential parsing issue(s)).

Figure 12B:
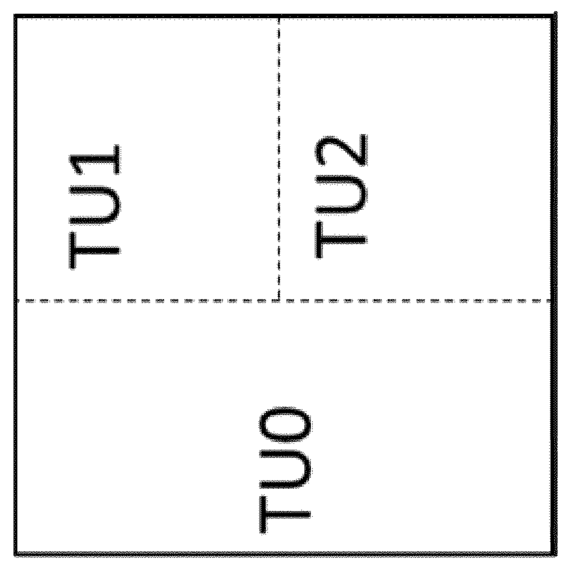
FIGS. 12A-B illustrate examples of TU split.
Figure 12A:
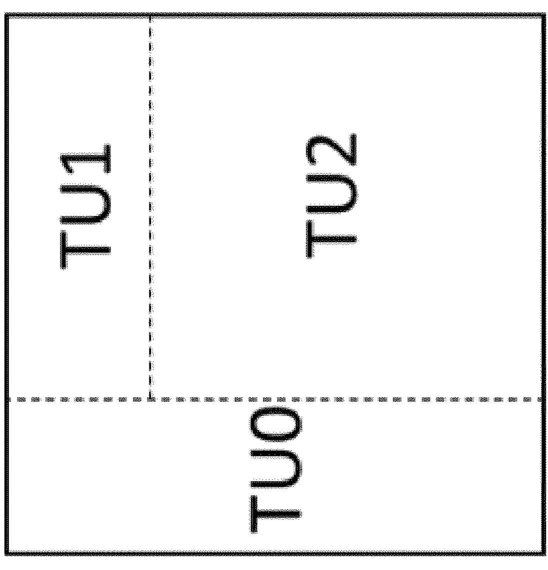

TU split information (e.g., TU split structure) may be inferred based on whether samples are close to the causal border of the current CU. FIGS. 12A-B illustrates examples of TU split. As illustrated in FIGS. 12A-B, the split direction may not be inferred but the split structure may be inferred. The block may be split in 3 TUs. 2 TUs (TU0 and TU1) may be close to a causal border and another one (TU2) may be farther from the causal border. A ¼ ¾ split may be used (e.g., as illustrated in FIG. 12A). A ½ ½ split may be used (e.g., as illustrated in FIG. 12B). In an example, TU0 and TU1 may be empty (e.g., not coded) and only TU2 may be coded.

Figure 13:
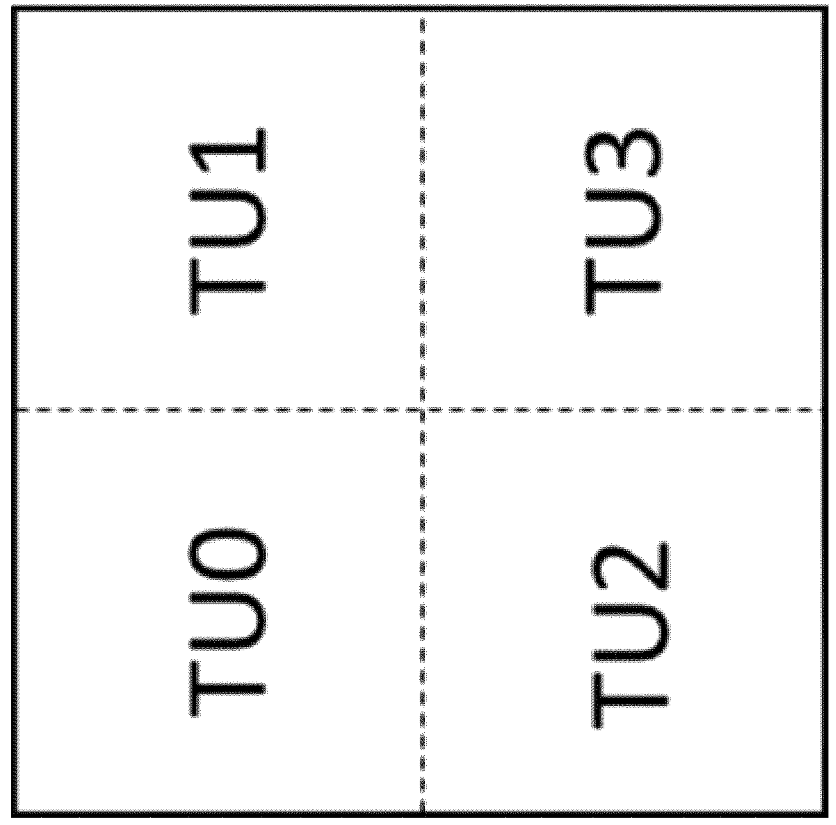
FIG. 13 illustrates an example of TU split.

TU split may be derived in an inter prediction block in an affine mode. TU split information may be inferred based on a motion model (e.g., an affine motion model) the current CU uses. FIG. 13 illustrates an example TU split. If the block uses an affine motion model, or any other non-uniform motion model (e.g., a SbTmvp model), the block may be inferred to be split in 4 TUs, e.g., to adapt to the possibly non-uniform residual (e.g., as depicted in FIGS. 12A-B). TU split be derived in an inter prediction block in a geometric/triangular mode. TU split information may be inferred based on whether a potential binary split contains a boundary of a geometric split.

Figure 14:
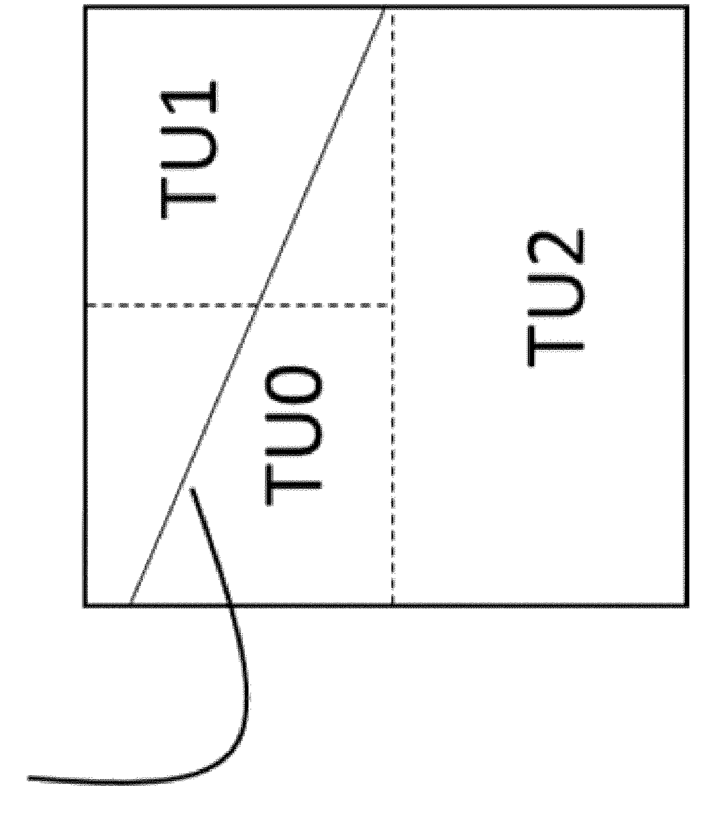
FIG. 14 illustrates an example of TU split.

FIG. 14 illustrates an example of TU split. As illustrated, the TU split tree may be inferred in the case of a triangular/geometric partition. The block may be split (e.g., recursively) into binary splits, e.g., such that one partition may not contain the boundary of the geometric split if possible. In the case that the condition herein is not possible, the remaining area containing the partition may be split in 2 TUs (for example, to keep the TU ratio as close as possible to 1).

Figure 15:
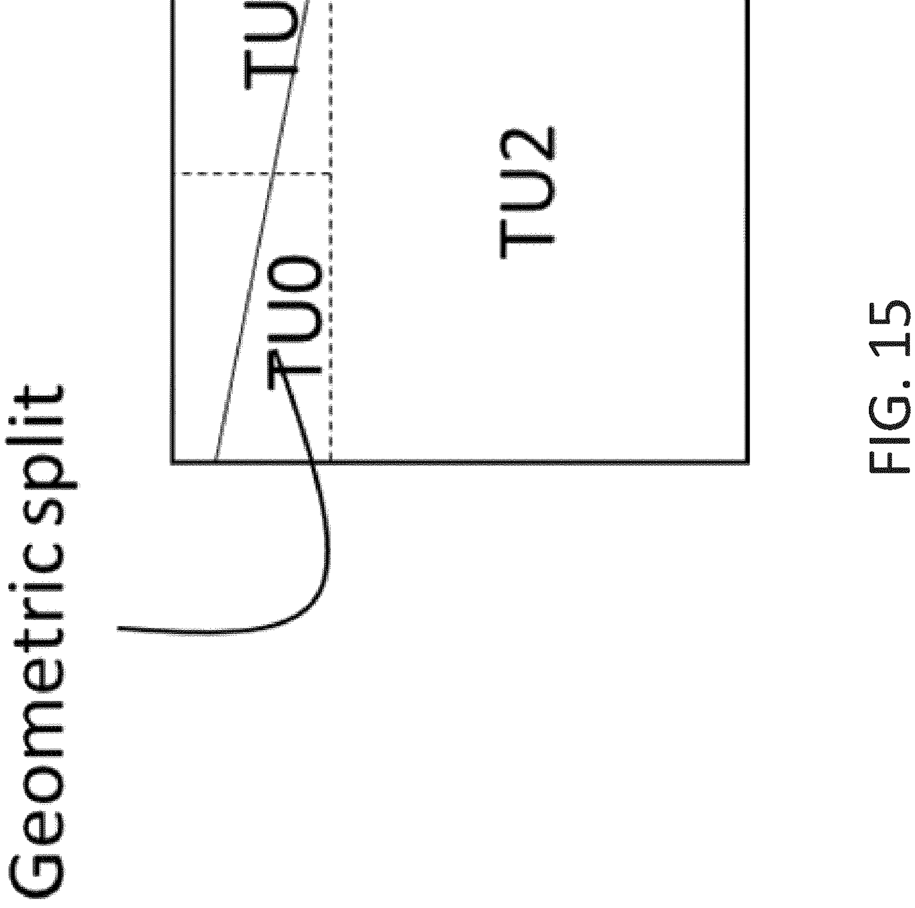
FIG. 15 illustrates an example of TU split.

FIG. 15 illustrates an example of TU split. As illustrated, a split ¼, ¾ may be used to better fit to the boundary. In an example, the TU2 is inferred to have a null residual.

Figure 16:
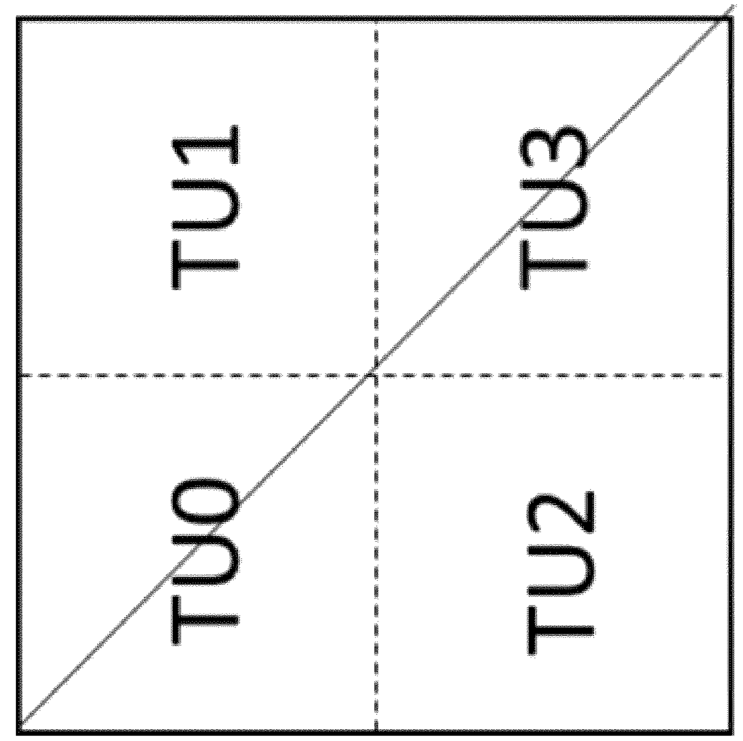
FIG. 16 illustrates an example of TU split.

FIG. 16 illustrates an example of TU split. The CU may be split into 4 TUs (e.g., a quadtree split or 2 successive binary splits). In an example, the TU not containing the boundary may be inferred to have a null residual (e.g., such as TU1 and TU2).

In other inter modes, such as combined inter-intra prediction (CIIP), overlapped block motion compensation (OBMC) or local illumination compensation (LIC), the prediction may be modified.

In OBMC, a subblock close to the causal border may be blended with 2 predictions based on (e.g., from) 2 different motion vectors. In LIC, a local illumination compensation may be computed from a causal template around the current block. In CIIP, the inter prediction may be blended with an intra prediction, e.g., with more weight assigned to sample(s) close to the causal border.

Figure 17:
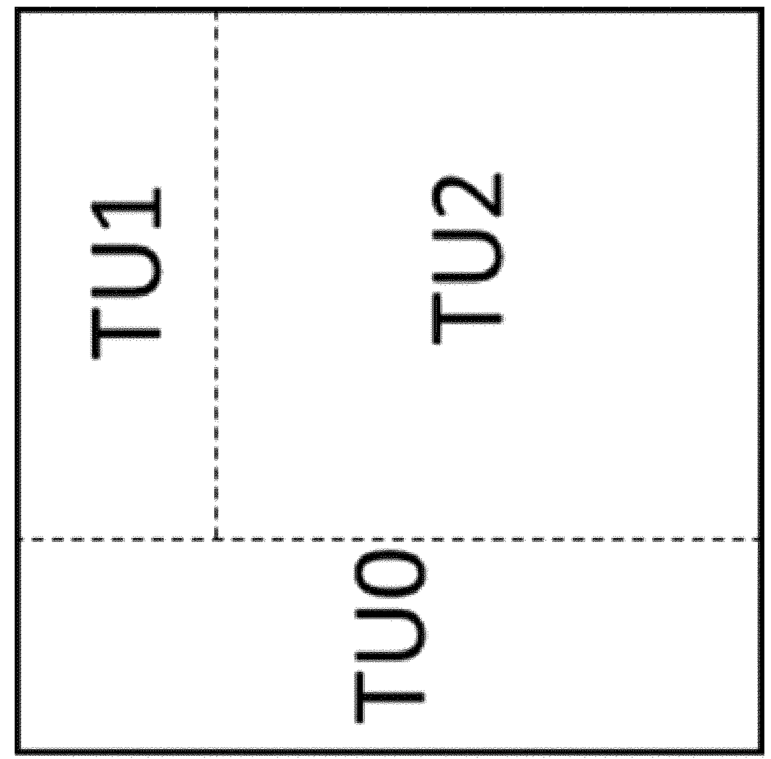
FIG. 17 illustrates an example of TU split.

In the modes described herein, the prediction may be better (e.g., intrinsically better), e.g., if the prediction is close to the causal border. A TU split may be performed based on such characteristic. FIG. 17 illustrates an example of TU split. As illustrated, 2 binary splits (asymmetric or not) may be performed (e.g., horizontally and/or vertically). The TU0 and TU1 (which may be the ones close to the causal border) may be inferred to have null residuals.

Different CABAC context(s) of a split (e.g., a particular split) signaling or a root coded block flag (e.g., root_cbf) signaling may be used (e.g., instead of inferring a split or a null residual for a particular TU as described herein).

For example, two contexts for the quadtree split may be designed. In the examples described herein, if the quadtree split is likely (for example, in the case of FIG. 14 or FIG. 16), the context 0 may be used. In other cases, such as if the quadtree split is not likely, the context 1 may be used.

For example, the root_cbf of the TU may be separated in two contexts. The two contexts are if the TU is likely to have null residual and if the TU is not likely to have null residual.

CU split may be derived/deduced using side information. For example, coded motion information associated with a coding block may be determined (e.g., based on indication(s) in the video bitstream). Motion information for the coding block may be derived based on the coded motion information. Whether a coding block split exists may be determined based on a difference between the derived motion information and the coded motion information. In an example, the coding block split may be determined to exist on a condition that the difference is above a threshold.

For example, the information may be obtained from a game engine. The motion information may be used to generate coded motion information associated with coding block(s). A video bitstream that includes indication(s) of the coded motion information associated with the coding block(s) may be generated.

If the side information (e.g., a depth and/or motion information) is available at encoder and decoder, the side information may be used to guide CU splitting and/or TU splitting.

In inter mode prediction, the CU splitting may be guided by motion field uniformity, e.g., with respect to a motion model (e.g., a translational or affine model). For example, for translational model, the motion field uniformity of the current block may be compared to a threshold. If the uniformity is below a threshold, the CU may be inferred to be split.

Figure 18:
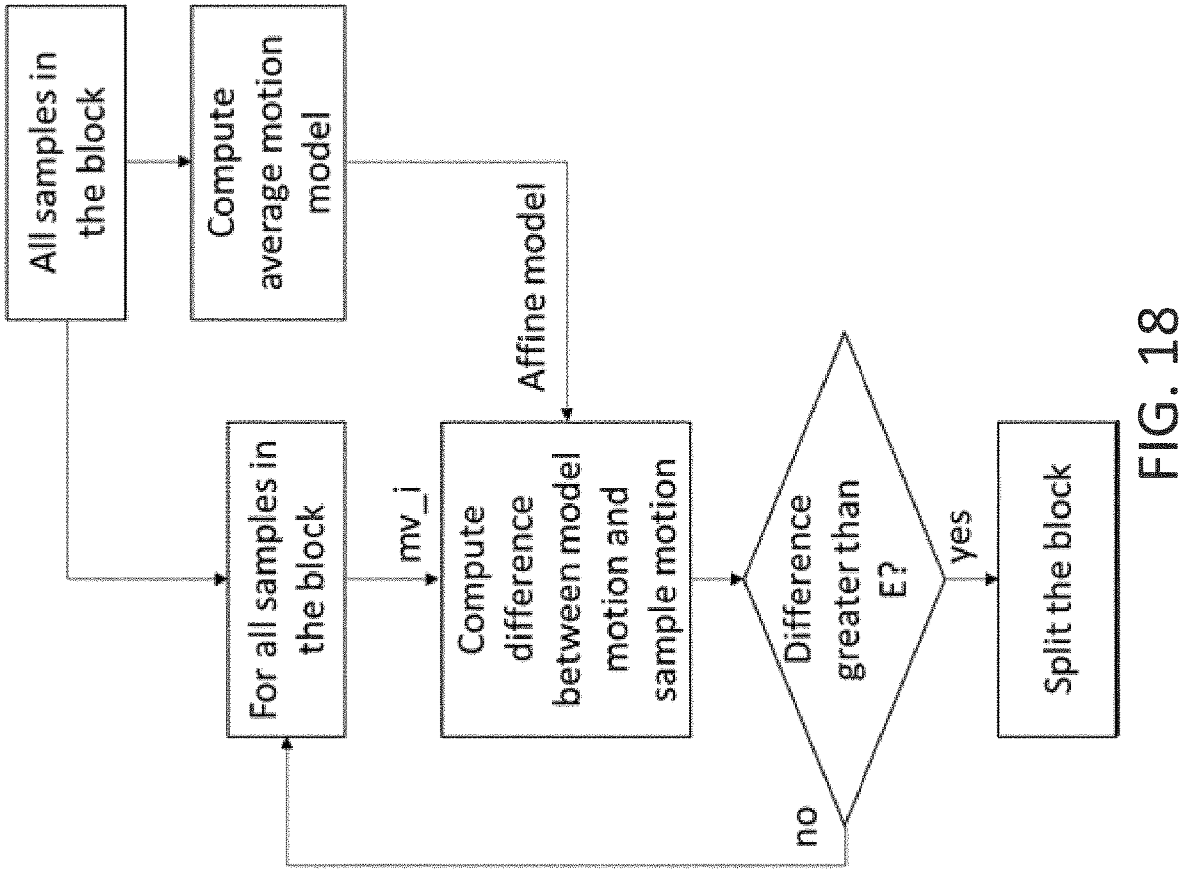
FIG. 18 illustrates an example block split decision process.

FIG. 18 illustrates an example block split decision process. In FIG. 18, a block split decision may be made for a block, in the case that an affine model is available as a motion model for the block. Motion of sample(s)/ subblock(s) (e.g., each sample/subblock) may be used to compute an average affine model (e.g., an affine model using a linear regression). The resulting motion (e.g., using the model) for sample(s)/subblock(s) (e.g., each sample/subblock) may be compared to the original motion of the sample(s)/subblock(s). If the difference is greater than a threshold, the block may be inferred to be split.

Figure 19:
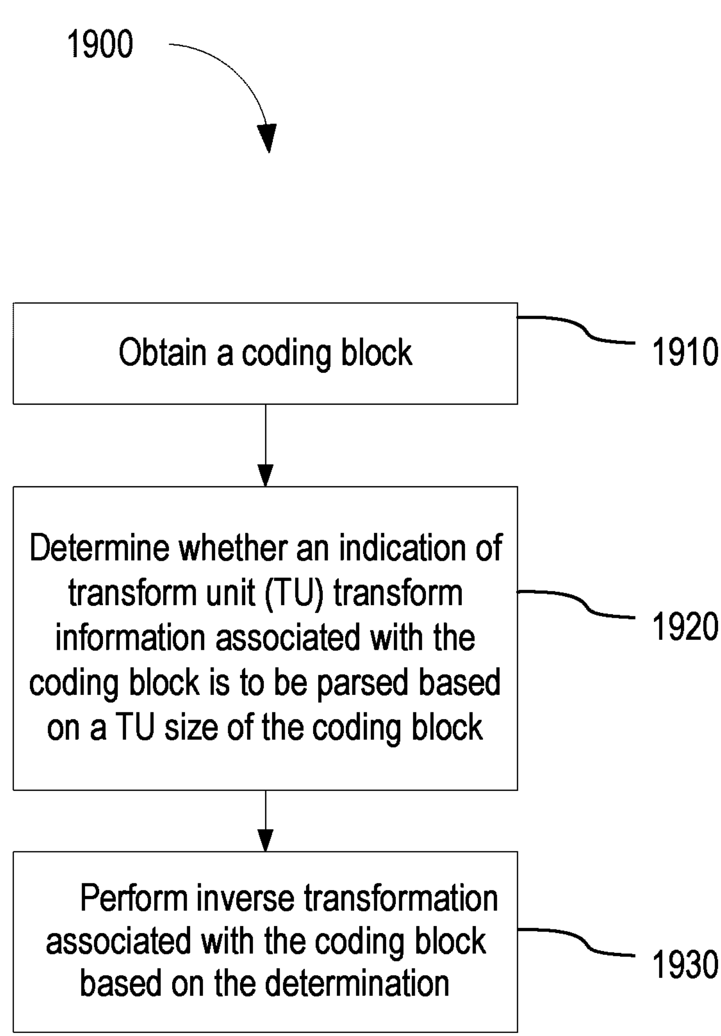
FIG. 19 illustrates an example flow chart for decoding a coding block.

FIG. 19 illustrates an example flow chart 1900 for decoding a coding block. At 1910, a coding block may be obtained. At 1920, it may be determined whether an indication of transform unit (TU) transform information associated with the coding block is to be parsed based on a TU size of the coding block. At 1930, inverse transformation associated with the coding block may be performed based on the determination.

Figure 20:
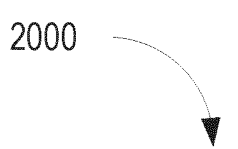
FIG. 20 illustrates an example flow chart for encoding a coding block.
Figure 20:
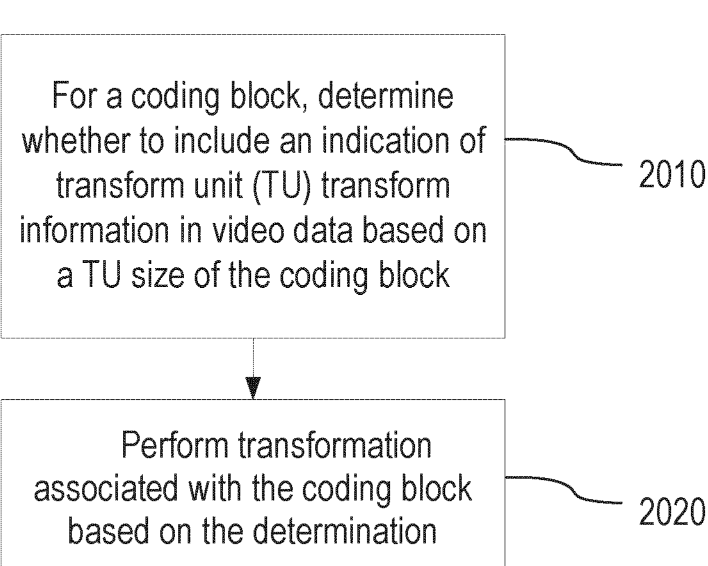

FIG. 20 illustrates an example flow chart 2000 for encoding a coding block. At 2010, for a coding block, it may be determined whether to include an indication of transform unit (TU) transform information in video data based on a TU size of the coding block. At 2020, transformation associated with the coding block may be performed based on the determination.

Figure 21:
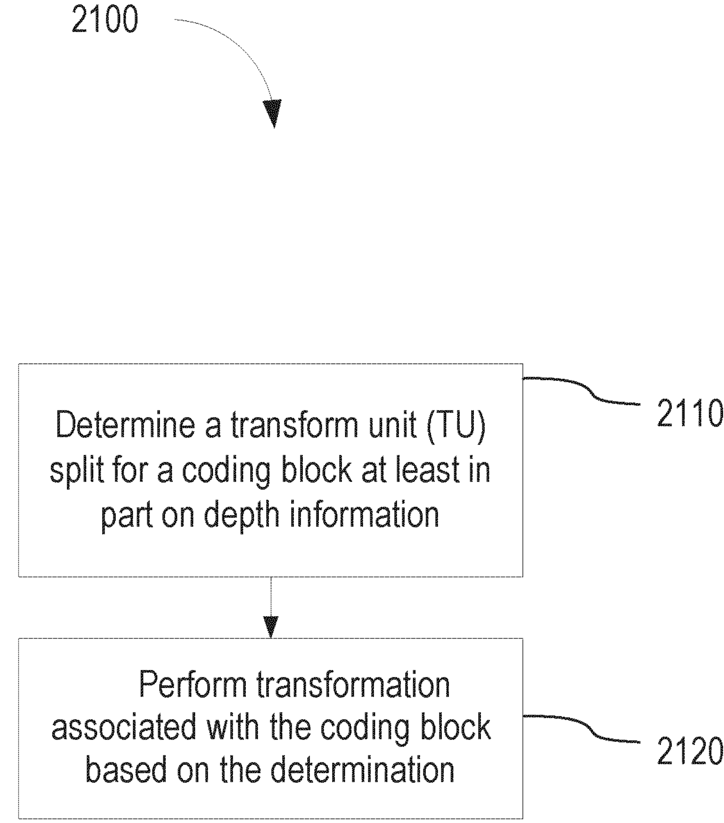
FIG. 21 illustrates an example flow chart for encoding a coding block.

FIG. 21 illustrates an example flow chart 2100 for encoding a coding block. At 2110, a transform unit split for a coding block may be determined based, at least in part, on depth information. At 2120, transformation associated with the coding block may be performed based on the determination.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A video decoding device, comprising:

a processor configured to:

obtain a coding block with a size smaller than a largest allowed size;

determine whether an indication of transform unit (TU) transform information associated with the coding block is to be parsed based on whether dimensions of the coding block are in a set of allowed coding block dimensions, wherein the indication of TU transform information associated with the coding block is configured to indicate whether the coding block is to be partitioned into a plurality of TUs; and perform inverse transformation associated with the coding block based on the determination.

2. The video decoding device of claim 1, wherein the processor is configured to:

based on a condition that the dimensions of the coding block are in the set of allowed coding block dimensions, determine to parse the indication of TU transform information associated with the coding block; and determine whether the coding block is to be partitioned based on the indication.

3. The video decoding device of claim 1, wherein based on a condition that the dimensions of the coding block are not in the set of allowed coding block dimensions, determine that the indication of TU transform information associated with the coding block is not to be parsed; and infer that the coding block is to be partitioned into a plurality of TUs.

4. The video decoding device of claim 1, wherein the indication of TU transform information is further configured to indicate whether at least a value of a residual block of the coding block is non-zero, and the processor is configured to:

based on a condition that the dimensions of the coding block are in the set of allowed coding block dimensions, determine to parse the indication of TU transform information associated with the coding block; and determine the value of the residual block of the coding block based on the indication.

5. The video decoding device of claim 1, wherein the indication of TU transform information is further configured to indicate whether at least a value of a residual block of the coding block is non-zero, and the processor is configured to:

based on a condition that the dimensions of the coding block are not in the set of allowed coding block dimensions, determine that the indication of TU transform information associated with the coding block is not to be parsed; and infer that the residual block of the coding block is zero.

6. The video decoding device of claim 1, wherein the indication of TU transform information is further configured to indicate a residual coding mode for the coding block, and the processor is configured to:

based on a condition that the dimensions of the coding block are in the set of allowed coding block dimensions, determine to parse the indication of TU transform information associated with the coding block that is configured to indicate the residual coding mode for the coding block; and determine the residual coding mode for the coding block based on the indication.

7. The video decoding device of claim 1, wherein the indication of TU transform information is further configured to indicate a residual coding mode for the coding block, and the processor is configured to:

based on a condition that the dimensions of the coding block are not in the set of allowed coding block dimensions, determine that the indication of TU transform information associated with the coding block is not to be parsed; and infer that the residual coding mode for the coding block is transform skip mode.

8. The video decoding device of claim 1, wherein the processor is further configured to:

obtain the set of allowed coding block dimensions; and determine whether the dimensions of the coding block correspond to dimensions in the set of allowed coding block dimensions.

9. The video decoding device of claim 1, wherein the processor is further configured to:

obtain a set of unsupported coding block dimensions; and determine whether the dimensions of the coding block correspond to unsupported dimensions in the set of unsupported coding block dimensions.

10. The video decoding device of claim 1, wherein the processor is further configured to:

determine a TU split characteristic for the coding block based on an intra-prediction mode of the coding block.

11. The video decoding device of claim 1, wherein the processor is further configured to:

determine a TU split characteristic for the coding block based on an inter-prediction mode of the coding block.

12. The video decoding device of claim 10, wherein the TU split characteristic comprises at least one of:

a TU split direction; or a TU split ratio.

13. A video encoding device, comprising:

a processor configured to:

for a coding block with a size smaller than a largest allowed size, determine whether to include an indication of transform unit (TU) transform information in video data based on whether dimensions of the coding block are in a set of allowed coding block dimensions, wherein the indication of TU transform information is configured to indicate whether the coding block is to be partitioned into a plurality of TUs;

perform transformation associated with the coding block based on the determination; and send the video data.

14. A method of video decoding, comprising:

obtaining a coding block with a size smaller than a largest allowed size;

determining whether an indication of transform unit (TU) transform information associated with the coding block is to be parsed based on whether dimensions of the coding block are in a set of allowed coding block dimensions, wherein the indication of TU transform information associated with the coding block is configured to indicate whether the coding block is to be partitioned into a plurality of TUs; and performing inverse transform associated with the coding block based on the determination.

15. The method of claim 14, wherein the method further comprising:

based on a condition that the dimensions of the coding block are in the set of allowed coding block dimensions, determining to parse the indication of TU transform information associated with the coding block; and determining whether the coding block is to be partitioned based on the indication.

16. The method of claim 14, wherein the method further comprising:

based on a condition that the dimensions of the coding block are not in the set of allowed coding block dimensions, determining that the indication of TU transform information associated with the coding block is not to be parsed; and inferring that the coding block is to be partitioned into a plurality of TUs.

17. The method of claim 14, wherein the indication of TU transform information is further configured to indicate whether at least a value of a residual block of the coding block is non-zero, the method further comprising:

based on a condition that the dimensions of the coding block are in the set of allowed coding block dimensions, determining to parse the indication of TU transform information associated with the coding block; and determining the value of the residual block of the coding block based on the indication.

18. The method of claim 14, wherein the indication of TU transform information is further configured to indicate whether at least a value of a residual block of the coding block is non-zero, the method further comprising:

based on a condition that the dimensions of the coding block are not in the set of allowed coding block dimensions, determining that the indication of TU transform information associated with the coding block is not to be parsed; and inferring that the residual block of the coding block is zero.

19. The method of claim 14, wherein the indication of TU transform information is further configured to indicate a residual coding mode for the coding block, the method further comprising:

based on a condition that the dimensions of the coding block are in the set of allowed coding block dimensions, determining to parse the indication of TU transform information associated with the coding block that is configured to indicate the residual coding mode for the coding block; and determining the residual coding mode for the coding block based on the indication.

20. The method of claim 14, wherein the indication of TU transform information is further configured to indicate a residual coding mode for the coding block, the method further comprising:

based on a condition that the dimensions of the coding block are not in the set of allowed coding block dimensions, determining that the indication of TU transform information associated with the coding block is not to be parsed; and inferring that the residual coding mode for the coding block is transform skip mode.

* * * * *